United States Patent [19]

Sasaki et al.

[11] Patent Number: 5,018,017

[45] Date of Patent: May 21, 1991

[54] ELECTRONIC STILL CAMERA AND IMAGE RECORDING METHOD THEREOF

[75] Inventors: Minoru Sasaki, Tokyo; Masafumi Umeda, Kawasaki; Yoshitomo Tagami, Yokohama; Akihiko Sugikawa, Yokohama, all of Japan

[73] Assignee: Kabushiki Kaisha Toshiba, Kawasaki, Japan

[21] Appl. No.: 447,858

[22] Filed: Dec. 8, 1989

Related U.S. Application Data

[63] Continuation-in-part of Ser. No. 289,238, Dec. 23, 1988.

[30] Foreign Application Priority Data

| Dec. 25, 1987 | [JP] | Japan | 62-327174 |
| Feb. 2, 1989 | [JP] | Japan | 1-22521 |
| Mar. 22, 1989 | [JP] | Japan | 1-67606 |
| Mar. 22, 1989 | [JP] | Japan | 1-67607 |

[51] Int. Cl.⁵ .................................... H04N 5/30
[52] U.S. Cl. ............................ 358/209; 358/335; 358/909
[58] Field of Search ............... 358/909, 209, 213.16, 358/213.25, 41, 12, 13, 133, 105, 906, 335

[56] References Cited

U.S. PATENT DOCUMENTS

| 4,489,351 | 12/1984 | d'Alayer de Costemore d'Arc | 358/909 |
| 4,745,474 | 5/1988 | Schiff | 358/105 |
| 4,758,883 | 7/1988 | Kawahara et al. | 358/335 |
| 4,802,003 | 1/1989 | Takei et al. | 358/12 |
| 4,837,628 | 6/1989 | Sasaki | 358/909 |
| 4,918,523 | 4/1990 | Simon et al. | 358/12 |

FOREIGN PATENT DOCUMENTS

| 0289944 | 11/1988 | European Pat. Off. . |
| 0269581 | 11/1987 | Japan . |
| 0224561 | 9/1988 | Japan . |
| 0284987 | 11/1988 | Japan . |

*Primary Examiner*—Tommy P. Chin
*Attorney, Agent, or Firm*—Oblon, Spivak, McClelland, Maier & Neustadt

[57] ABSTRACT

An electronic still camera has a memory card, which is detachably provided, for recording photographed image data. The electronic still camera comprises a data compression unit for compressing image data to be recorded, a mode selection unit provided in association with the data compression unit to select a recording mode or compression mode, a buffer memory for once storing the image data compressed in the compression mode selected by the mode selection unit, and a determination unit for determining whether or not the image data stored in the buffer memory can be recorded on the recording medium. In the electronic still camera, when the image data was determined to be unrecordable by the determination unit, the image data stored in the memory is stored in the buffer memory till the recording medias assumes a recordable state.

18 Claims, 23 Drawing Sheets

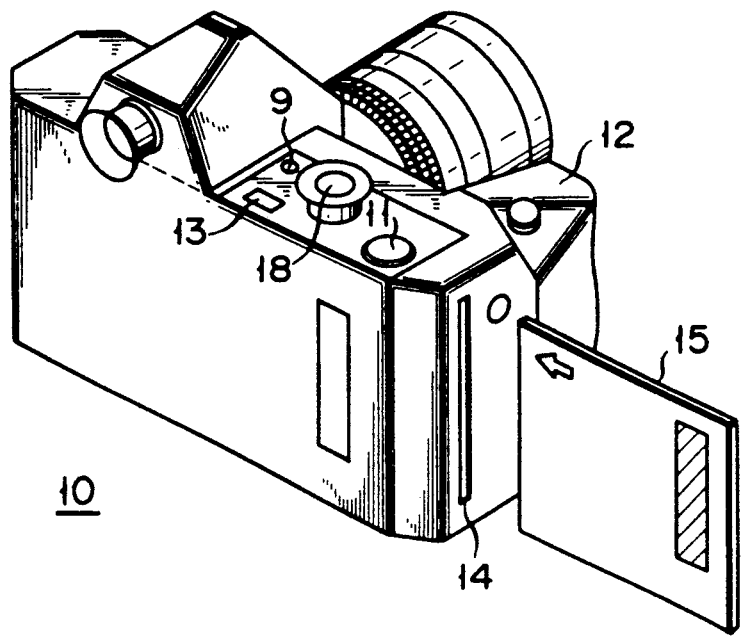
F I G. 1
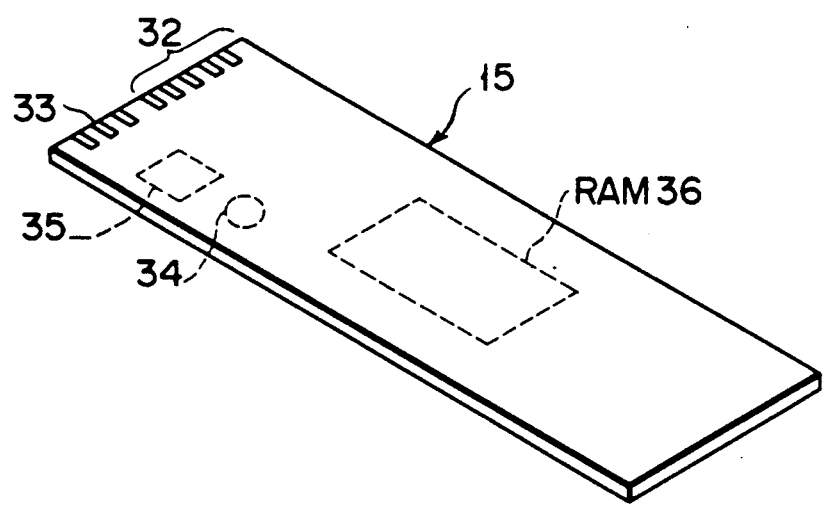
F I G. 3

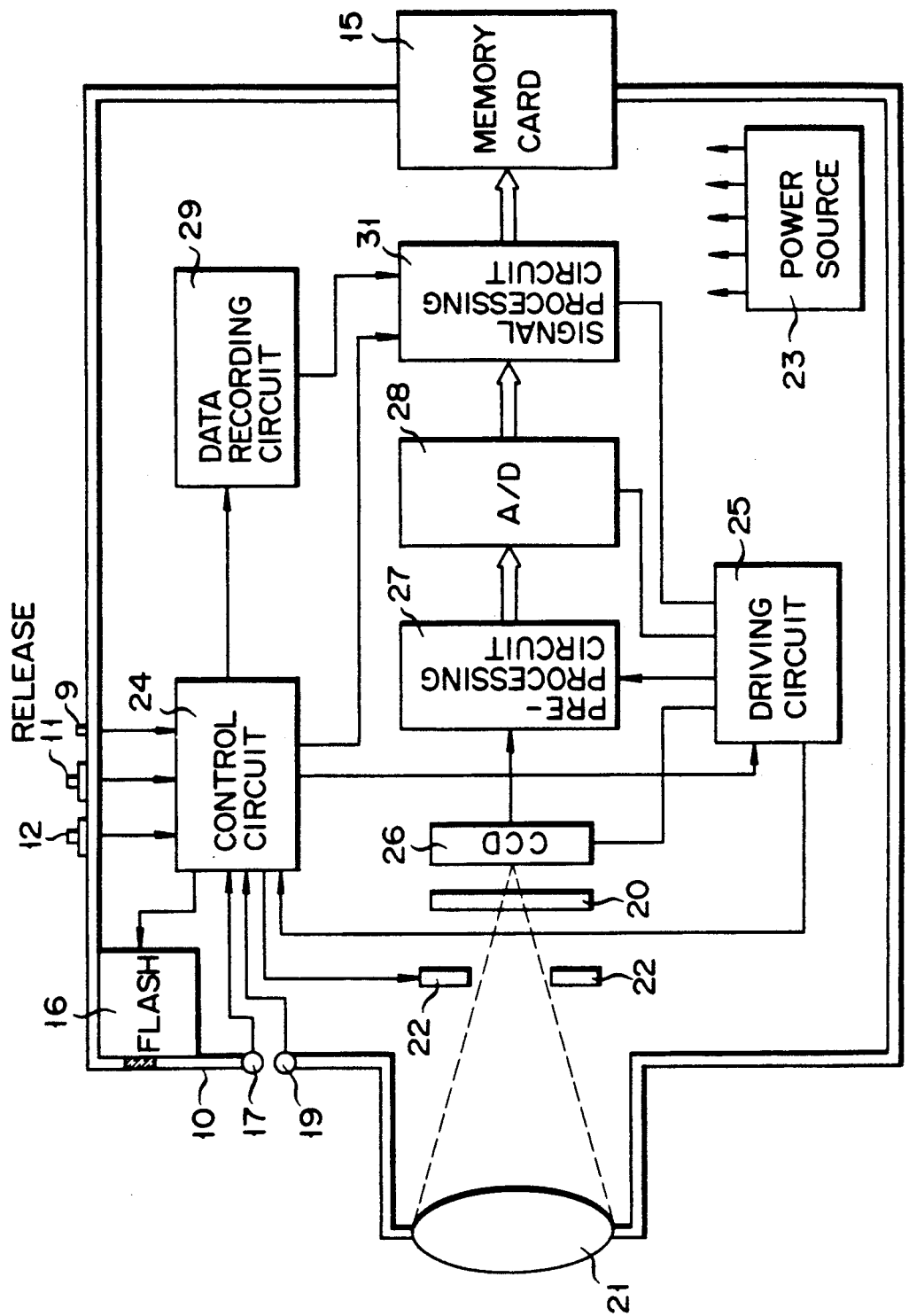
F I G. 2

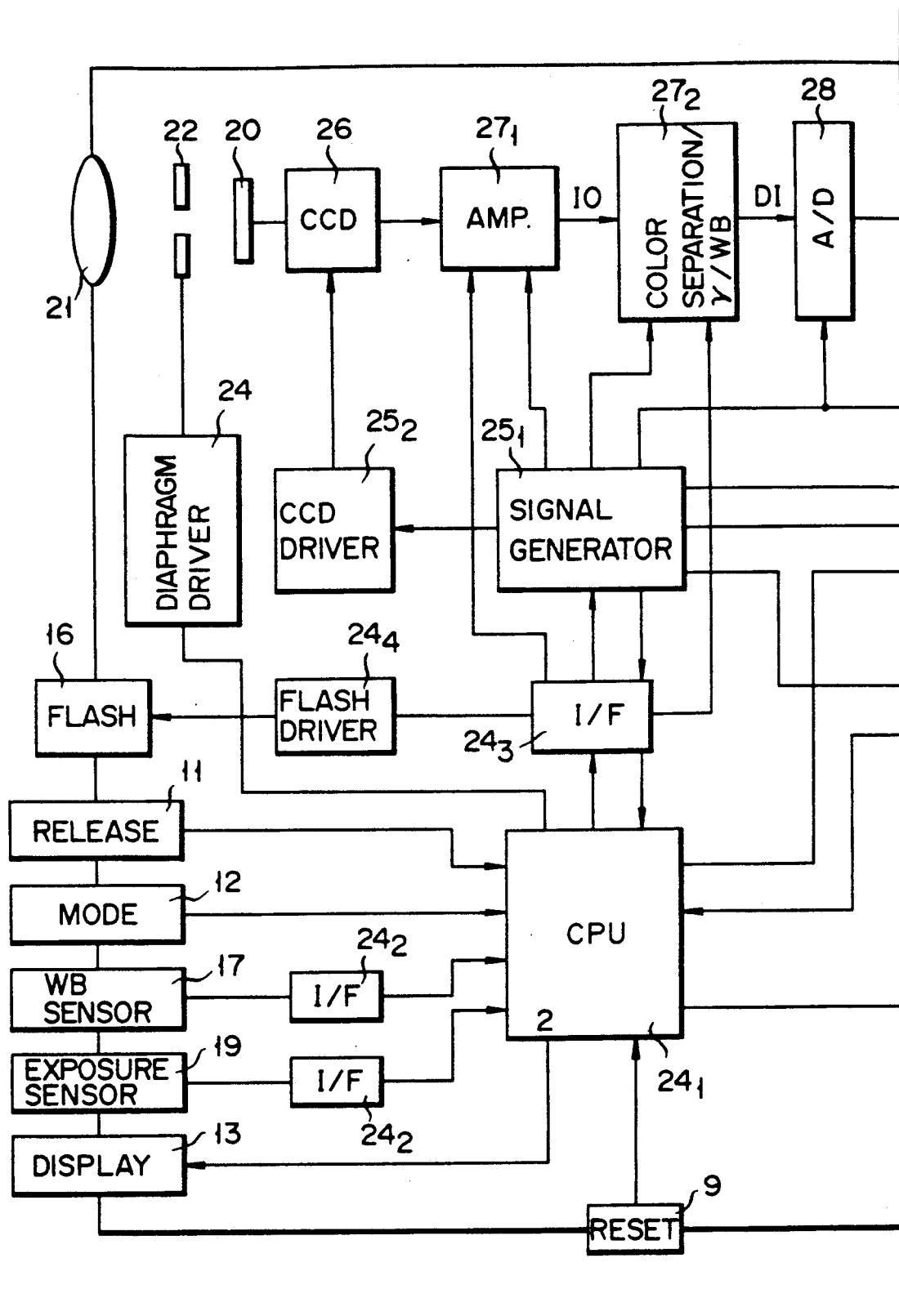
F I G. 6A

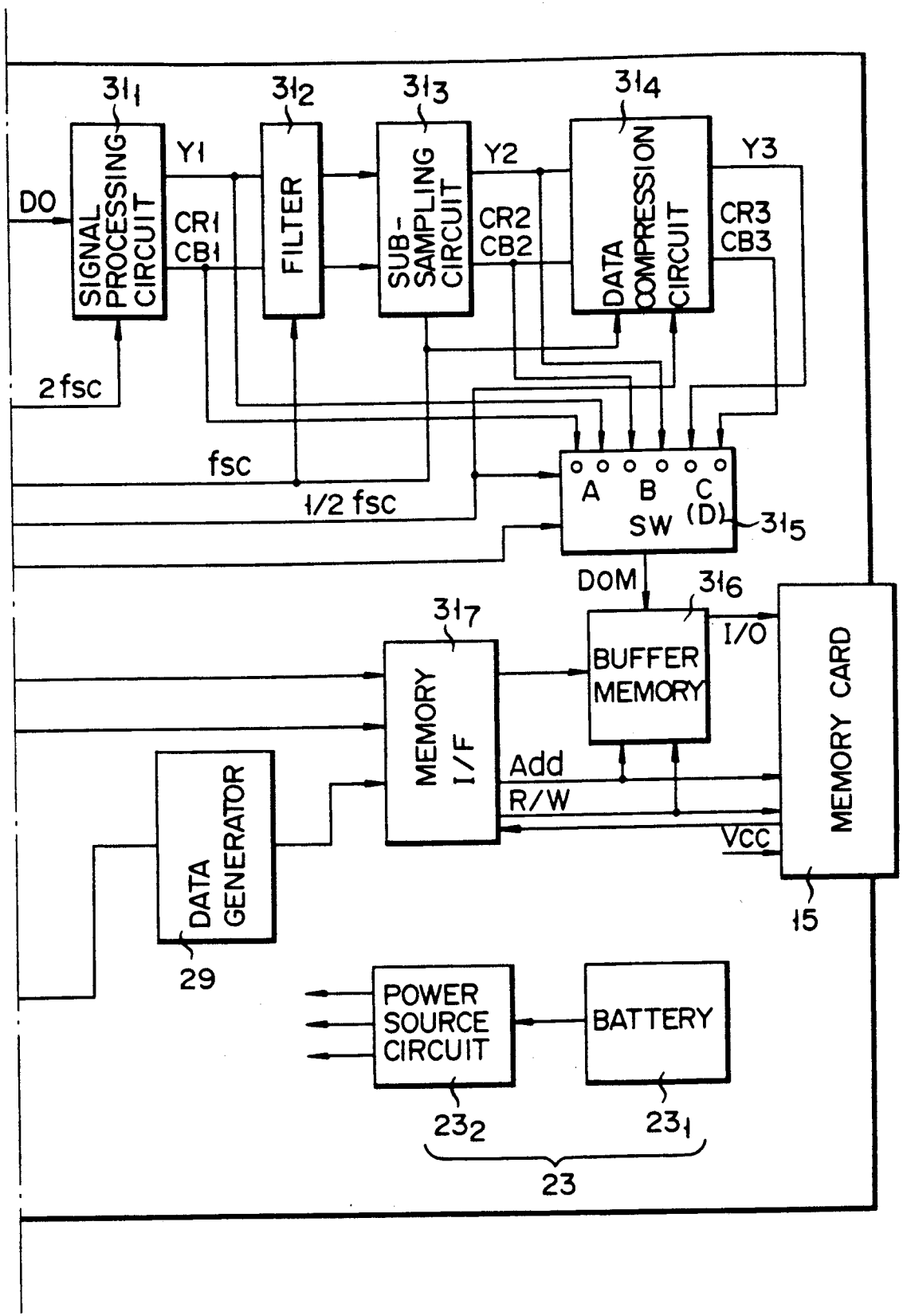
F I G. 6B

FIG. 7

| Y1 | | | | | CR1 | | | | | CB1 | | | |
|---|---|---|---|---|---|---|---|---|---|---|---|---|---|
| | Y14 | Y24 | Y34 | Y44 | | CR12 | CR22 | CR32 | CR42 | | CB12 | CB22 | CB32 | CB42 |
| | Y13 | Y23 | Y33 | Y43 | | | | | | | | | | |
| | Y12 | Y22 | Y32 | Y42 | | | | | | | | | | |
| Y11 | Y21 | Y31 | Y41 | | CR11 | CR21 | CR31 | CR41 | | CB11 | CB21 | CB31 | CB41 | |

FIG. 8

| Y2 | | | | CR2 | | | | CB2 | | | |
|---|---|---|---|---|---|---|---|---|---|---|---|
| | Y12 | Y22 | Y32 | Y42 | CR12 | | CR32 | | | CB22 | | CB42 |
| | Y21 | Y41 | | | | | | | | | | |
| Y11 | Y31 | | CR11 | CR31 | | CB21 | CB41 | | | | | |

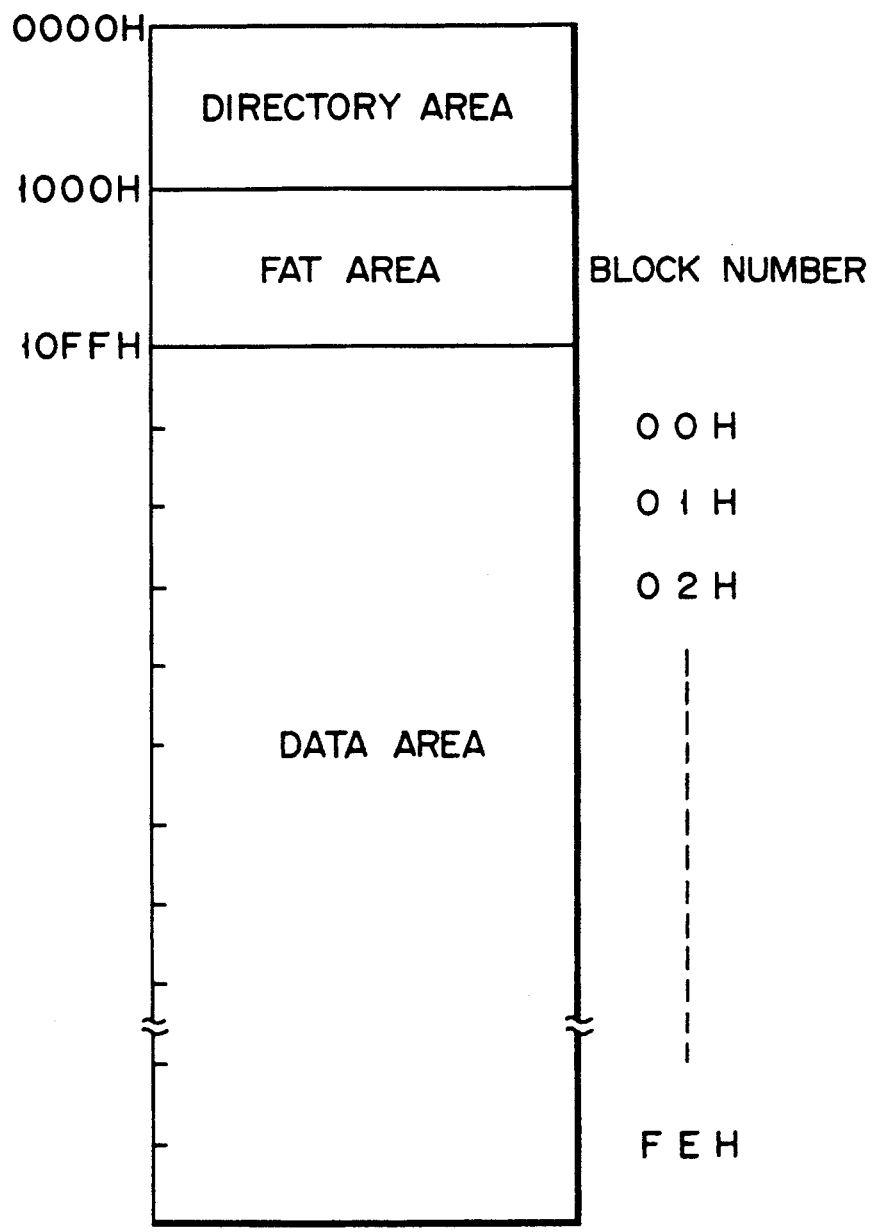
F I G. 9A

DIRECTORY

| Field | Label | Values |
|---|---|---|
| 1 BYTE | FILE NO. (IMAGE NO.) | |
| | INFORMATION CLASSIFICATION | IMAGE, VOICE, DATA |
| | IMAGING SYSTEM | 525/60, 625/50 |
| | IMAGE MODE | IMAGE COMPRESSION MODE |
| | VOICE MODE | VOICE COMPRESSION MODE |
| | YEAR | |
| | MONTH | |
| | DATE | |
| | HOUR | |
| | MINUTE | |
| | | |
| | | |
| | | |
| | | |
| 11 H | ENTRY BLOCK NO. | |
| 04 H | NUMBER OF BLOCKS USED | |

1 DIRECTORY     16 BYTE

NUMBER OF DIRECTORIES     256

FIG. 9B

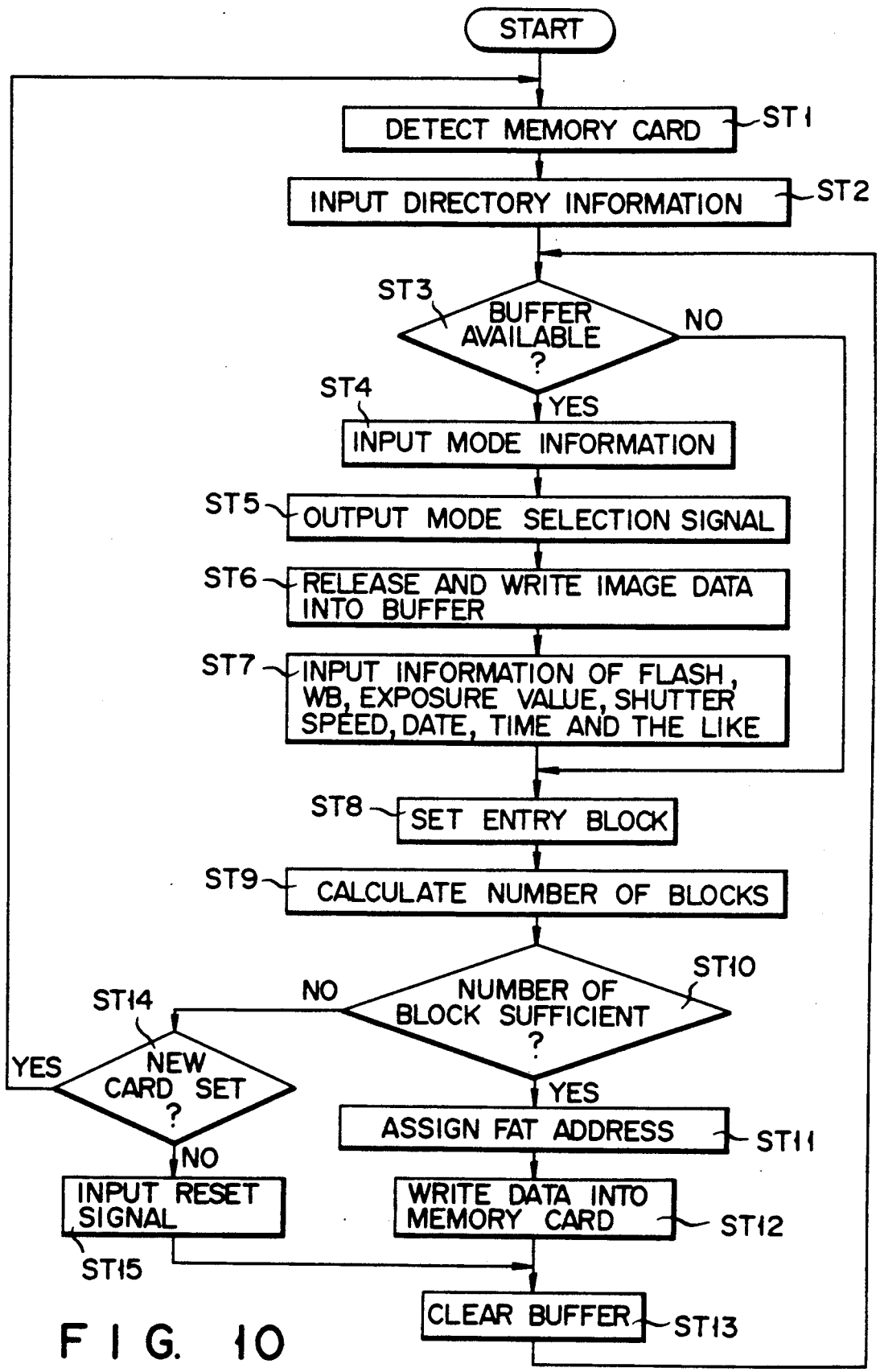
F I G. 10

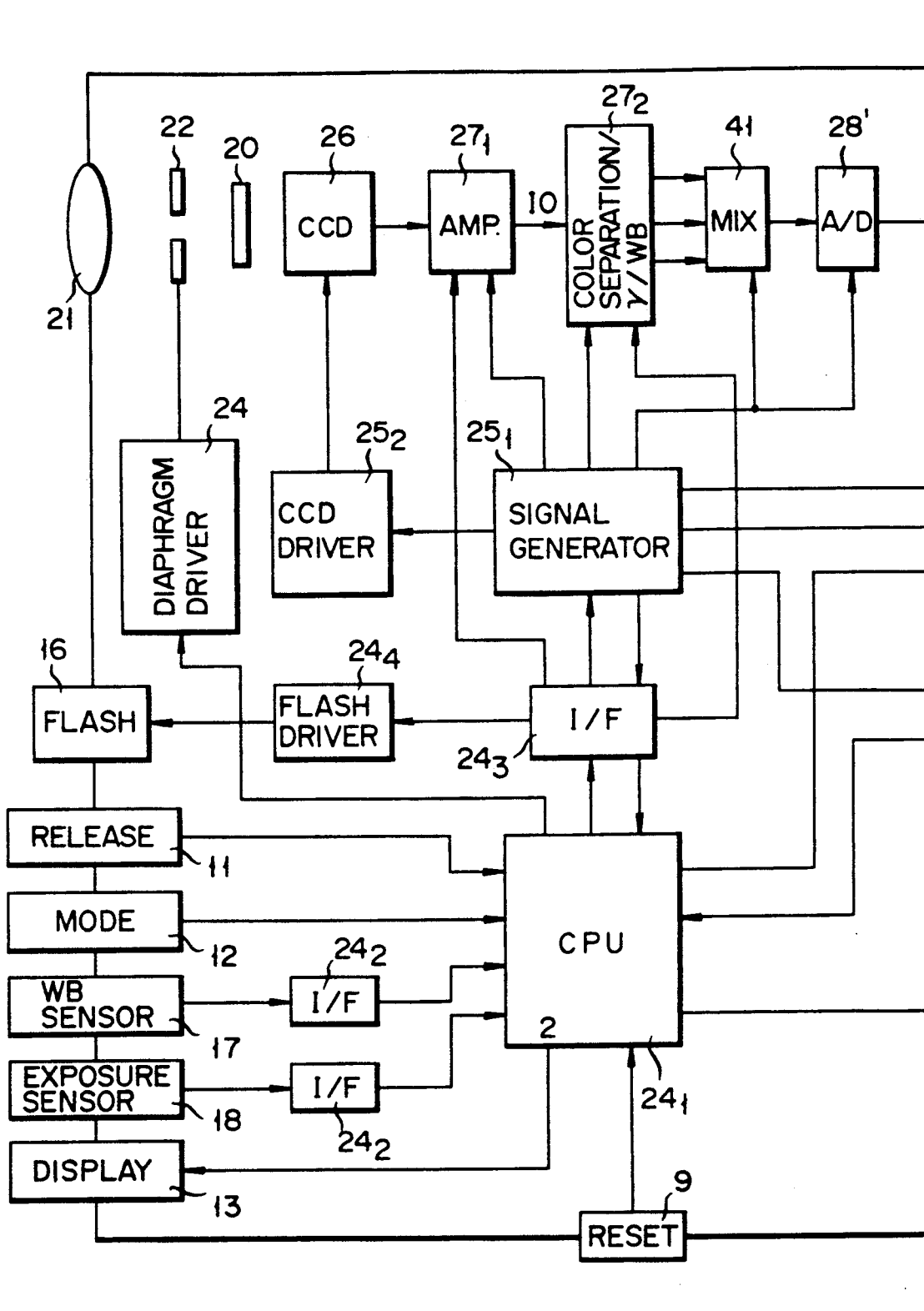
F I G. 12A

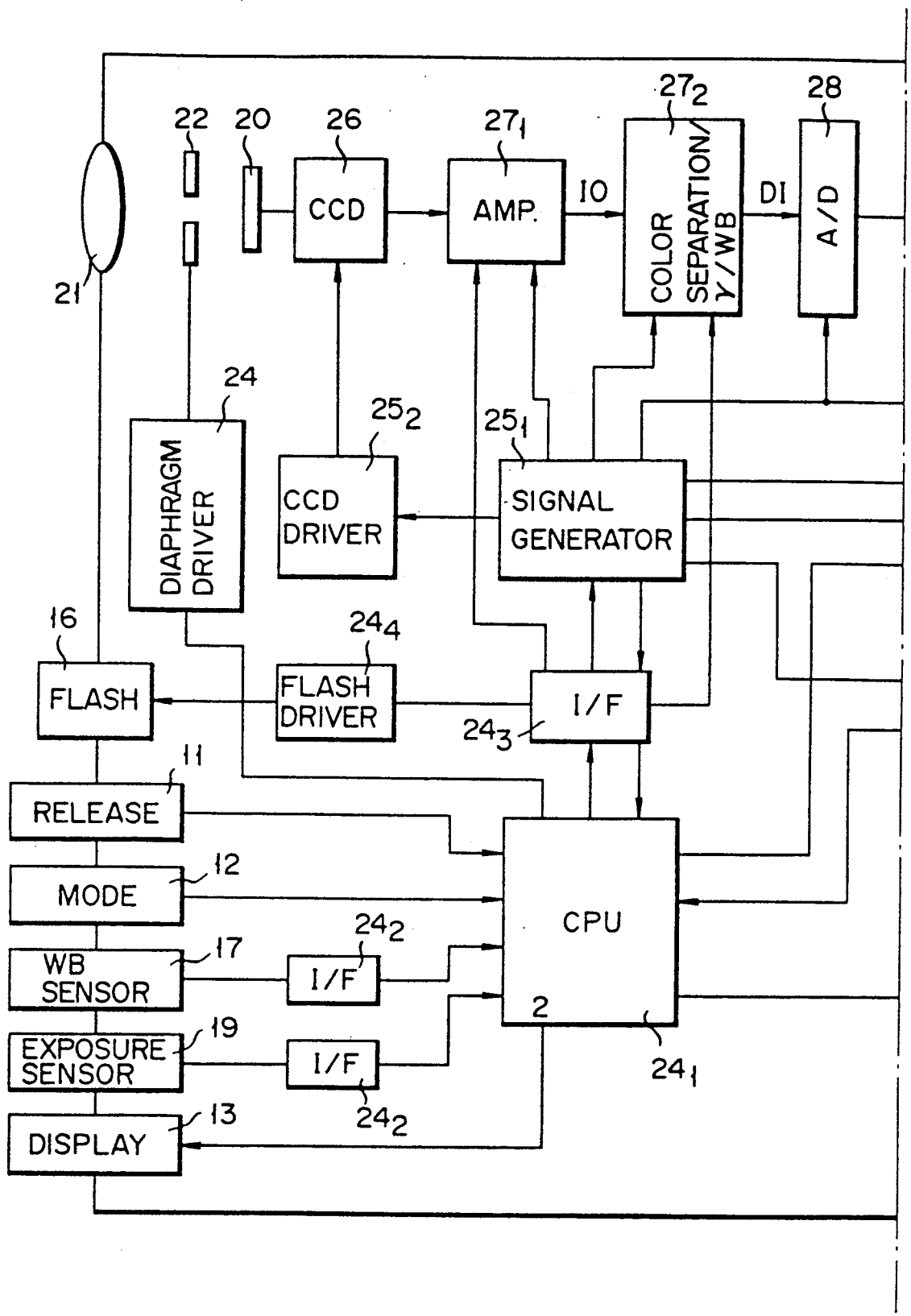
F I G. 14A

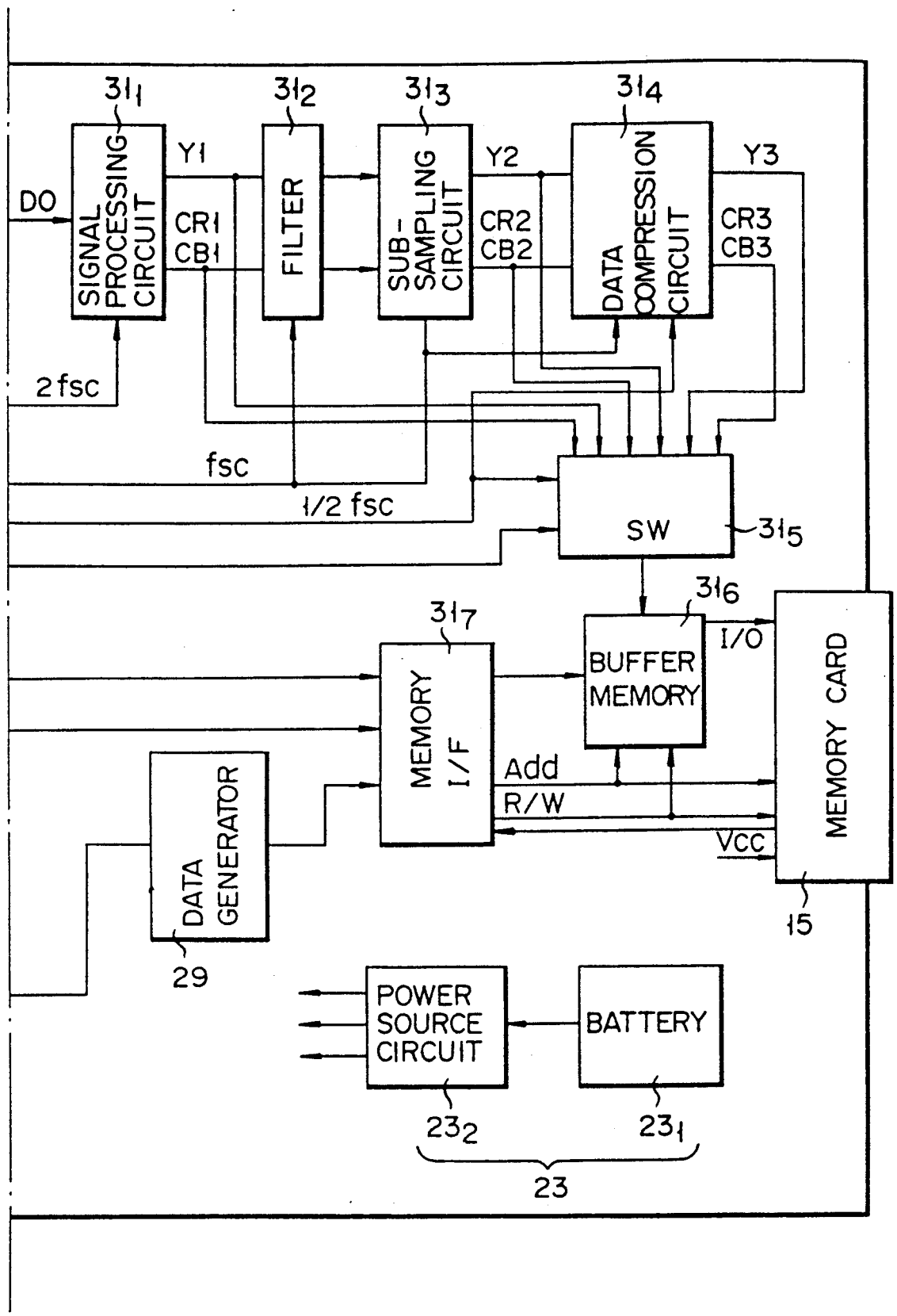
F I G. 14B

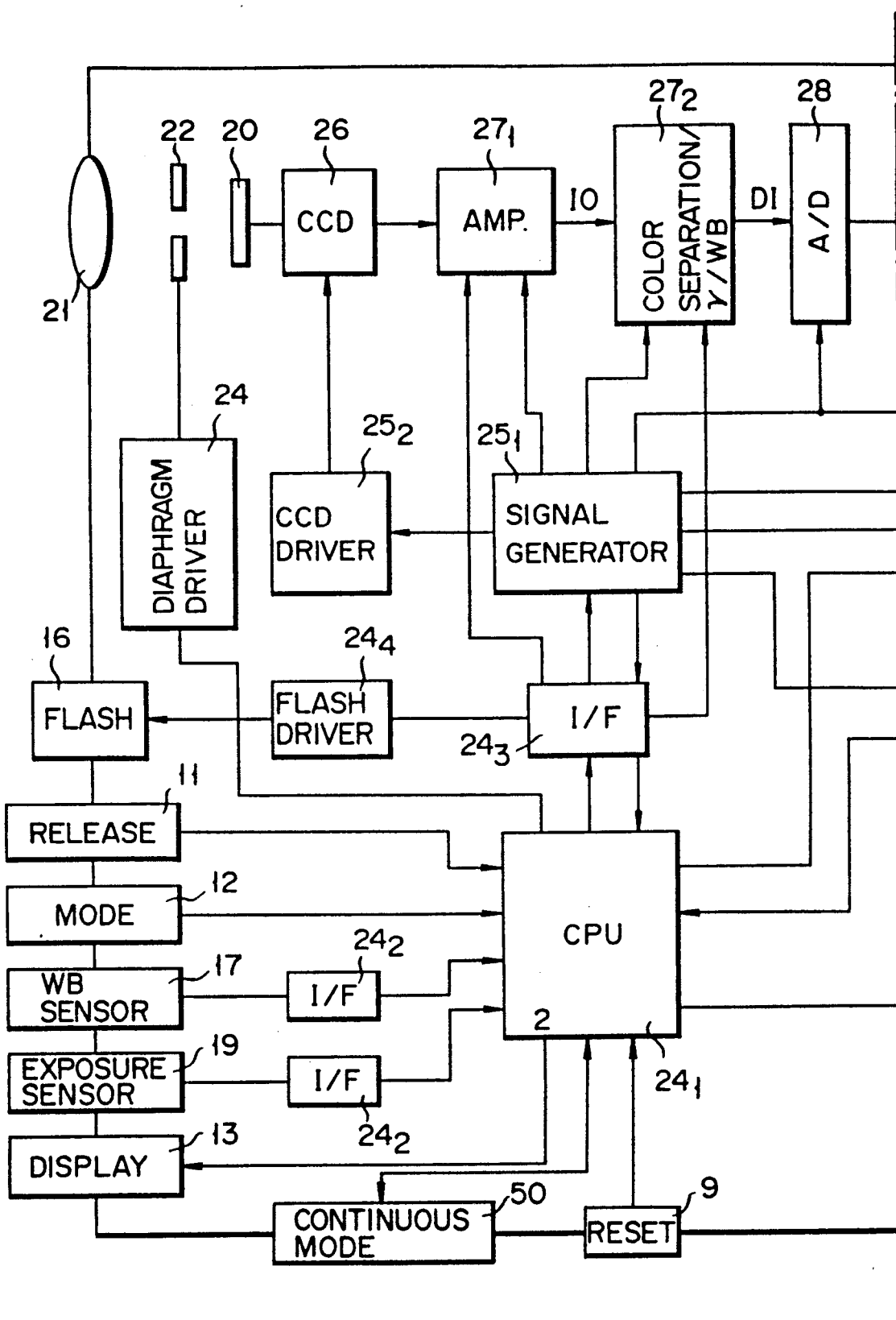
F I G. 16A

DIRECTORY

| Bytes | Field | Values |
|---|---|---|
| 1 BYTE | FILE NO. (IMAGE NO.) | |
| | INFORMATION CLASSIFICATION | IMAGE, VOICE, DATA |
| | IMAGING SYSTEM | 525/60, 625/50 |
| | IMAGE MODE | IMAGE COMPRESSION MODE |
| | VOICE MODE | VOICE COMPRESSION MODE |
| | YEAR | |
| | MONTH | |
| | DATE | |
| | HOUR | |
| | MINUTE | |
| | | |
| | | |
| | MEMORY TYPE | SRAM, E²PROM |
| | ACCESS TIME | |
| 11H | ENTRY BLOCK NO. | |
| 04H | NUMBER OF BLOCKS USED | |

1 DIRECTORY    16 BYTE

NUMBER OF DIRECTORIES    256

F I G. 17

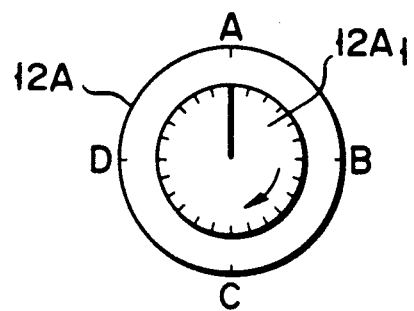
F I G. 18A
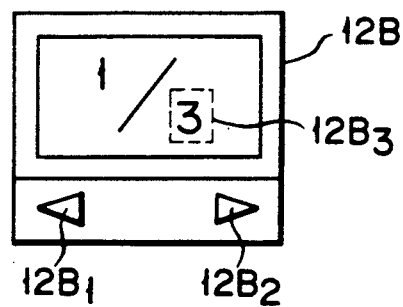
F I G. 18B

ELECTRONIC STILL CAMERA AND IMAGE RECORDING METHOD THEREOF

CROSS-REFERENCES TO THE RELATED APPLICATIONS

The present application is a continuation-in-part application of U.S. patent application Ser. No. 289,238 filed on Dec. 23, 1988.

BACKGROUND OF THE INVENTION

The present invention relates to an electronic still camera, which uses, for example, a semiconductor memory card as a recording medium, for recording still images on the recording medium.

DESCRIPTION OF THE RELATED ART

Electronic still cameras which use a solid state imaging device such as a CCD (charge coupled device) for photographing still images of subjects and recording the still images on rotatable magnetic recording medium, that is, a video floppy, are considered to replace conventional still cameras for photographing and recording still images by use of the photosensitivity of silver salt films, that is, photographic films using silver salt photosensitive material, and they have been merchandized. However, since this type of electronic still camera uses the rotatable magnetic recording medium, a driving unit for driving the rotatable magnetic recording medium relative to the recording head must be provided inside the camera, thus making it difficult to reduce the size of the camera. A solid state electronic still camera system for recrding image information on a memory card using a semiconductor memory (that is, storing image information in a semiconductor memory of a memory card), as a system which has no driving unit and is suitable for small sized cameras, has been considered by the same applicant (U.S. application Ser. No. 073,160, Minoru Sasaki). A typical example of this type of electronic still camera is shown in FIG. 13.

An image of the subject is transmitted via lens 121, diaphragm 122 and color filter 120, and formed on CCD 126 which is used as the imaging device in which the optical image is subjected to a photoelectric conversion. An output signal of CCD 126 is subjected to a predetermined process in preprocessing circuit 127, converted into a digital signal by means of analog-to-digital (A/D) converter 128, and then recorded on memory card 115. In this case, a signal from each picture element of the imaging device is recorded in the digital form on memory card 115. The signal of each picture element of the imaging device is subjected to a predetermined process such as the amplification, white-balance correction and γ correction as the pre-processing. Picture element data, which has been subjected to the pre-processing in a sequence according to the picture element array, is recorded on memory card 115. In the reproduction mode, memory card 115 is set in a reproducing unit, and data stored in memory card 115 is subjected to a predetermined signal processing and digital-to-analog (D/A) conversion, and then supplied to a TV (television) monitor which in turn displays the data as an image. In FIG. 13, case 110, release switch 111 for triggering the imaging operation, battery 123 used as a power source, shutter control circuit 124 for controlling diaphragm 122 and electronic shutter operation, CCD driving circuit 125, and monitoring unit 130 are also shown. CCD driving circuit 125 is used to control and drive shutter control circuit 126, pre-processing circuit 127, A/D converter 128 and memory card 115. Monitoring unit 130 displays the photographed image based on signals transmitted via pre-processing circuit 127 at the time of photographing and is used as a view finder.

As described above, wherein data corresponding to each picture element of the solid state imaging device is recorded on the memory card, the signal processing is simple and the device is simple in construction. However, if the recording conditions such as the number of picture elements and the arrangement of color filters of the solid state imaging device of the electronic still camera are changed, for example, the arrangement of data recorded on the memory card or the amount of data per frame will be changed accordingly. Therefore, the recorded memory card is not interchangeably used for another type of electronic still camera system, that is, an electronic still camera having the number of picture elements and arrangement of color filters different from those of the electronic still camera used for recording the image data on the memory card.

If a single electronic still camera is designed so as to record image under different recording conditions, the recorded memory card may be interchangeably used to some extent. However, in this case, the memory capacity required for recording one frame of image data of the photographed still image varies depending on the recording conditions (recording modes) set at the time of photographing. Therefore, in a case where new image data is written into a recording area in which one frame of image data has been previously recorded and erased, the memory capacity may sometimes be insufficient for recording the new image data, thus making it impossible to record the new image data.

SUMMARY OF THE INVENTION

An object of this invention is to solve the aforementioned disadvantages and provide a new electronic still camera and an image recording method by which the memory capacity required for recording one frame of data can be changed as required, the number of images to be recorded on one recording medium can be efficiently changed according to the image quality, and which can flexibly cope with a shortage in residual amount of the recording medium mounted at the time of photographing and the non-coincidence of the recording area when a suitable frame is erased and a new image is recorded.

In an electronic still camera of this invention, a recording medium for recording a photographed image data, for example, a memory card is detachably provided. The electronic still camera comprises a data compression unit for compressing an image data to be recorded, a mode selection unit provided in association with the data compression unit to select a recording mode, that is, a compression mode, a buffer memory for temporarily storing an image data compressed in the compression mode selected by the mode selection unit, and a determination unit for determining whether or not the image data stored in the buffer memory can be recorded on the recording medium. In the electronic still camera, when "NO" is determined by the determination unit, the image data stored in the memory is stored in the buffer memory of the camera until the recording medium assumes a recordable state, that is, until a new memory card is mounted, for example. Preferably, the compression mode includes an uncompression mode not applied with the data compression by the data compression unit.

In the electronic still camera according to a preferred embodiment of the present invention, an image signal subjected to photoelectric conversion by a solid state imaging device is digitalized by a signal processing circuit and coded, and the coded digital data is recorded on a memory card. In the electronic still camera, an image signal is converted into a brightness signal and two color-difference signals by a signal processing circuit and recorded on a memory card. In the electronic still camera, the image data can be compressed and the total bit capacity for recording one frame of image data can be reduced by changing the number of samples and by non-linear quantitizing an error with an expected signal to reduce the number of bits required to express one sample data, and the brightness signal and two color-difference signals can be written into the memory card as the recording medium. Also, the number of frames of images written into a memory card can be changed as desired accordingly. In the electronic still camera, the memory of the memory card is divided into blocks of fixed capacity, a number or name is set to each block, data in each frame is divided into several blocks and recorded, and the number of blocks used for each frame and the number or name of the first block are recorded whereby even if the memory of different capacity is used every frame, writing, reading, erasing or rewriting can be easily made.

In the electronic still camera according to the present invention, there are a plurality of compression modes having different compressibility, and an user can suitably select any of these modes. In the electronic still camera as described, even if the capacity of the recording medium or the data amount of one frame is determined so that the capacity capable of being recorded by one recording medium, for example, a memory card, is the natural number times of the data amount of one frame in all the recording modes, when a plurality of different compression modes are selected for one recording medium, for example, the memory card, a surplus of the memory capacity less than one frame inevitably sometimes occurs. In other words, there sometimes occurs a case where a shortage of capacity not capable of recording an image of one frame on the memory capacity finally left occurs. In the light of this, in the electronic still camera of the present invention, when a shortage in capacity of the memory card attached occurs for photographed image data, and the transfer of the photographed image data to the memory card is effected for the first time when a new memory card is attached and the image data assumes a state capable of being recorded. Accordingly, the user can suitably select and photograph the compression mode without being troubled by the residual capacity of the recording medium or the kind of compression modes when the compression mode is selected.

In the electronic still camera according to the present invention, the number of images capable of being recorded on the recording medium for example memory card, can be efficiently changed depending on the image quality, and even if plural kinds of image data processed according to different modes are mixed and recorded on a single recording medium, no inconvenience occurs. Moreover, in the electronic still camera, it is possible to erase only data of one frame to record a new image data in an easy manner. Furthermore, in the electronic still camera, even in the case where the shortage in capacity of the recording medium attached has been found after imaging had been made, the imaging content can be recorded on another recording medium. Accordingly, the present invention can provide an electronic still camera and an image recording method which can be conveniently used as a system including the recording medium.

BRIEF DESCRIPTION OF THE DRAWINGS

FIG. 1 is a perspective view showing an appearance of an electronic still camera according to a first embodiment of this invention;

FIG. 2 is a diagram schematically showing the construction of the electronic still camera shown in FIG. 1;

FIG. 3 is a perspective view illustrating the basic construction of a semiconductor memory card used in the electronic still camera shown in the embodiment of FIG. 1;

FIGS. 6A and 6B are diagrams showing the detailed construction of the electronic still camera shown in FIG. 2;

FIGS. 7 and 8 are views illustrating the sampling points of the image data in the embodiment shown in FIG. 1 on the assumption that the positions thereof lie on a 2-dimensional plane;

FIGS. 9A to 9E are views illustrating the recording formats of the memory card used in the embodiment shown in FIG. 1;

FIG. 10 is a flowchart showing the process in detail at the time of photographing effected by the embodiment shown in FIG. 1;

FIGS. 12A and 12B are block diagrams showing the detailed construction of a second embodiment of this invention;

FIGS. 14A and 14B are block diagrams showing the detailed construction of a third embodiment of this invention;

FIGS. 16A and 16B are block diagrams showing the detailed construction of a fourth embodiment of this invention;

FIG. 17 is a view for explaining a format of a directory within a memory card in the embodiments shown in FIGS. 16A and 16B; and FIGS. 18A and 18B are views illustrating examples of mode switch.

DETAILED DESCRIPTION OF THE PREFERRED EMBODIMENTS

Figure 4:
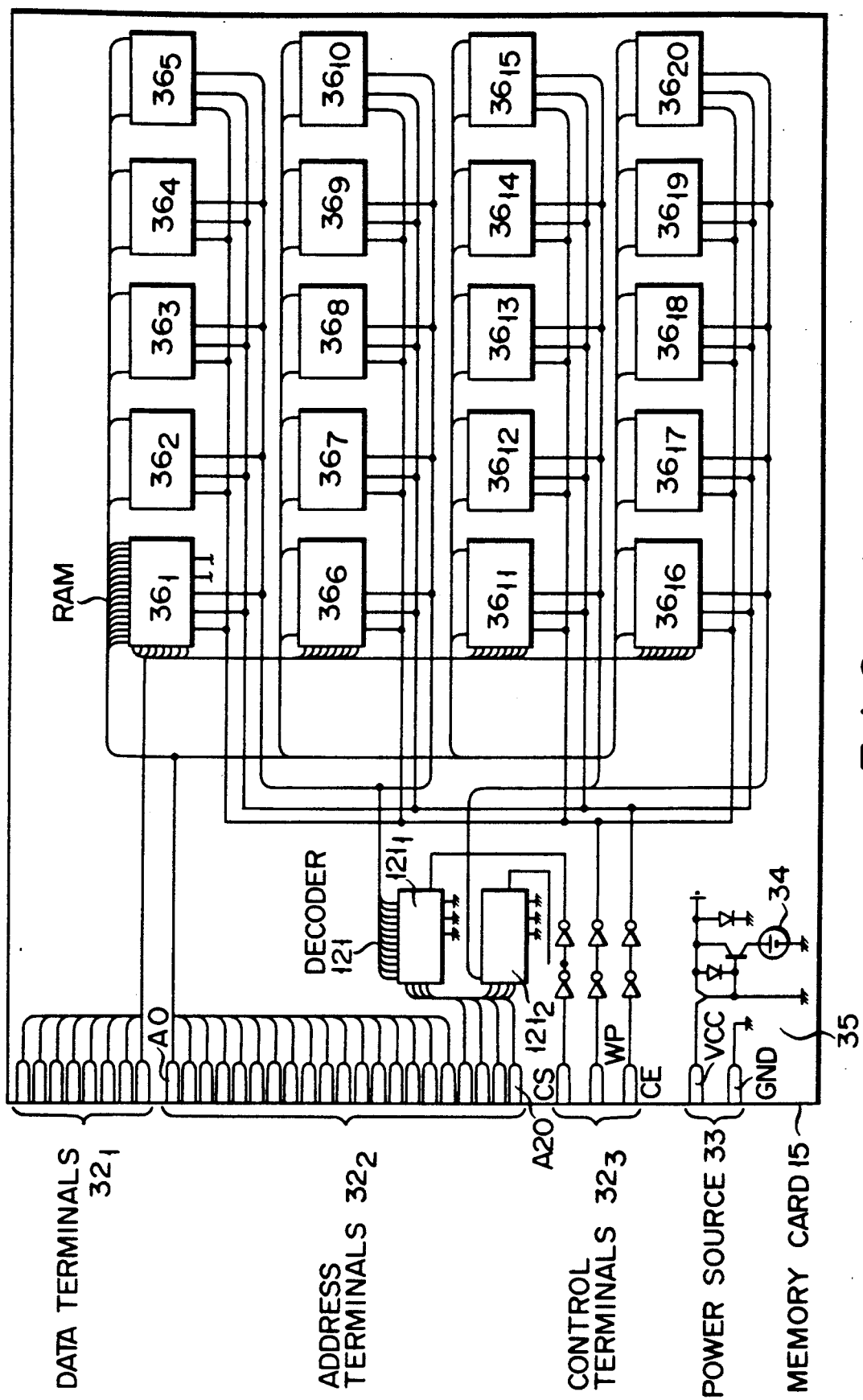
FIG. 4 is a diagram illustrating the detail construction of the memory card shown in FIG. 3.

There will now be described an electronic still camera according to an embodiment of this invention with reference to the accompanying drawings.

An electronic still camera system, as used hereinafter is defined as including an electronic still camera and a reproducing unit. The electronic still camera is used to take a picture of a subject and record the image on a semiconductor memory card used as recording medium, and the reproducing unit is used to read out image information from the memory card and transfer the image information to TV receiver or the like for display.

FIG. 1 is a perspective view of the electronic still camera as viewed from the rear upper point thereof, and the explanation for portions thereof which have the same functions as those of an ordinary still camera (using a photographic film) is omitted. Electronic still camera 10 includes reset switch 9, release 11, photographing mode switch 12 and photographed picture number displaying unit 13. Further, insertion slot 14 is provided for permitting insertion of semiconductor memory card 15 on the right side of electronic still camera 10. Shutter speed selection dial 18 is disposed on the electronic still camera 10. These elements will be described more in detail later.

FIG. 2 schematically shows the basic construction of electronic still camera 10. In the photographing operation, focusing is effected by lens system 21 and the shutter speed is adequately set by operating shutter speed selection dial 18 in the same manner as in the ordinary still camera. Diaphragm 22 is controlled by control circuit 24, and the shutter speed is adjusted by a so-called electronic shutter. The electronic shutter adjusts the shutter speed by controlling the charge storing time in CCD array 26 used as an image device. An image of a shutter is formed on CCD array 26 via lens system 21.

When the photographing operation is started and release 11 is set into the halfway position (the release button is depressed halfway) by an operator or user, the power source voltage from power source 23 using a battery is supplied to the respective electronic circuit sections (that is, when the power source switch not shown is turned on, the power source voltage is supplied only to a portion required in the preparation stage of photographing, and the power source voltage is supplied to other portions required for photographing for the first time when the release 11 assumes the halfway position). The amount of incident light is measured by exposure sensor 19, and control circuit 24 controls diaphragm 22 according to the measured amount of incident light. The external color temperature is measured by white balance sensor 17, and control circuit 24 generates a white balance control signal according to the measured color temperature.

When release 11 is further depressed from the halfway position to the fully depressed position (the release button is fully depressed), control circuit 24 produces a shutter pulse. In response to the shutter pulse, driving circuit 25 supplies control signals to CCD array 26, pre-processing circuit 27, A/D conversion circuit 28 and signal processing 31 which are in turn operated in response to the respective control signal. An image information signal formed of an analog signal from CCD array 26 is supplied to A/D conversion circuit 28 via pre-processing circuit 27 and is converted into a corresponding digital signal. The image information signal thus converted into the digital form is subjected to a predetermined signal processing in signal processing circuit 31. A digital image information signal from signal processing circuit 31 is supplied to semiconductor memory card 15 together with a control signal with an address signal. In this way, the image information signal corresponding to the photographed still image is stored in semiconductor memory card 15.

Prior to the photographing, the user can selectively set the format of data to be stored in semiconductor memory card 15 by operating mode switch 12. Mode switch 12 is used to select and set a desired one of a plurality of modes for different image qualities. Mode selection by mode switch 12 makes it possible to change the amount of digital data required for storing one frame image (i.e., the number of image frames which can be stored in one memory card 15). For example, when high quality mode is set, one frame image is stored as digital data of 640 Kbytes with the highest image quality. When mode "B" is set, one frame image is stored as digital data of 320 Kbytes with the second highest image quality, and when mode "C" is set, one frame image of 160 Kbytes is stored with the third highest image quality. Further, when mode "D" or low image quality mode is set, one frame image of 80 Kbytes corresponding to the smallest memory space for one frame is stored. If memory card 15 is provided with a memory of 2.56 Mbytes, for example, it is possible to store 4, 8, 16 and 32 frames into one memory card 15 in modes "A", "B", "C" and "D", respectively. The selection of the recording modes by the mode switch 15 is effected every frame. The details of a method for storing data into the memory card 15 will be described later.

In the above description, the data amount in one frame is set by selecting one of the invariable modes. However, the compression rate of data amount may be set freely set by the user. In the case of the former (i.e., selecting one mode), for example, a dial-type switch 12A, wherein modes (A) to (D) correspond to four selections of a dial 12A1, as shown in FIG. 18A, can be used as the mode switch 12. In this type of mode switch, the dial 12A1 is rotated to select one of the modes (A) to (D). In the case of the latter (i.e., freely setting the compression rate of data amount), a switch 12B, which comprises, as shown in FIG. 18B, a pair of triangular button switches 12B1 and 12B2 arranged in opposite directions and a display 12B3 for displaying the compression rate, can be used. In the mode switch 12, the compression rate 1/N (N: an integer having a predetermined value or less that determines the limit of compression) is displayed on the display 12B3. Upon operation of the button switches 12B1 and 12B2, the value N is increased or decreased to set a desired compression rate.

FIG. 3 shows the basic construction of memory card 15. Memory card 15 is constituted by a printed circuit board having a plurality of random access memory (RAM) chips 36 mounted thereon. External terminals 32 including data terminals, address terminals and control terminals, and power source terminals 33 are provided on one side of memory card 15. For use of memory card 15, it is inserted into electronic still camera 10 or a reproducing unit. Supply of the power source voltage to memory card 15 is achieved via power source terminals 33, and transfer of signals with respect to memory card 15 is effected via external terminals 32. Exclusive battery 34 used for holding stored data is built in memory card 15. Further, memory card 15 includes power source switching circuit 35 which switches the power source of RAM chip 36 from built-in battery 34 to power source 23 of electronic still camera 10 or the power source of the reproducing unit when memory card 15 is inserted into electronic still camera 15 or the reproducing unit, respectively.

FIG. 4 shows an example of memory card 15 having 20 1 M-byts RAM chips $36_1$ to $36_{20}$. External terminals $32_1$ to $32_3$ and power source terminals 33 are provided on one side of memory card 15. External terminals $32_1$ to $32_3$ include 8-bit data terminals $32_1$, address terminals $32_2$ for receiving address information A0 to A20 and control terminals $32_3$. Memory card 15 of FIG. 4 has a memory capacity of 20 Mbytes (2.56 Mbytes). Control terminals $32_3$ include terminal CS for selection of RAM chips 36, write pulse terminals WP and card selection terminals CE for selecting one of cards when a plurality of cards are used. One of decoders $121_1$ and $121_2$ is selected by an input supplied to terminals CS. Decorders $121_1$ and $121_2$ respectively correspond to RAM chips $36_1$ to $36_{10}$ and $36_{11}$ to $36_{20}$.

CCD array 26 which is a solid state imaging device is used as an imaging device for photographing still frame images, for example. A frame interline transfer type CCD may be suitable for the CCD array 26 used in the electronic still camera of this invention, for example.

Figure 5:
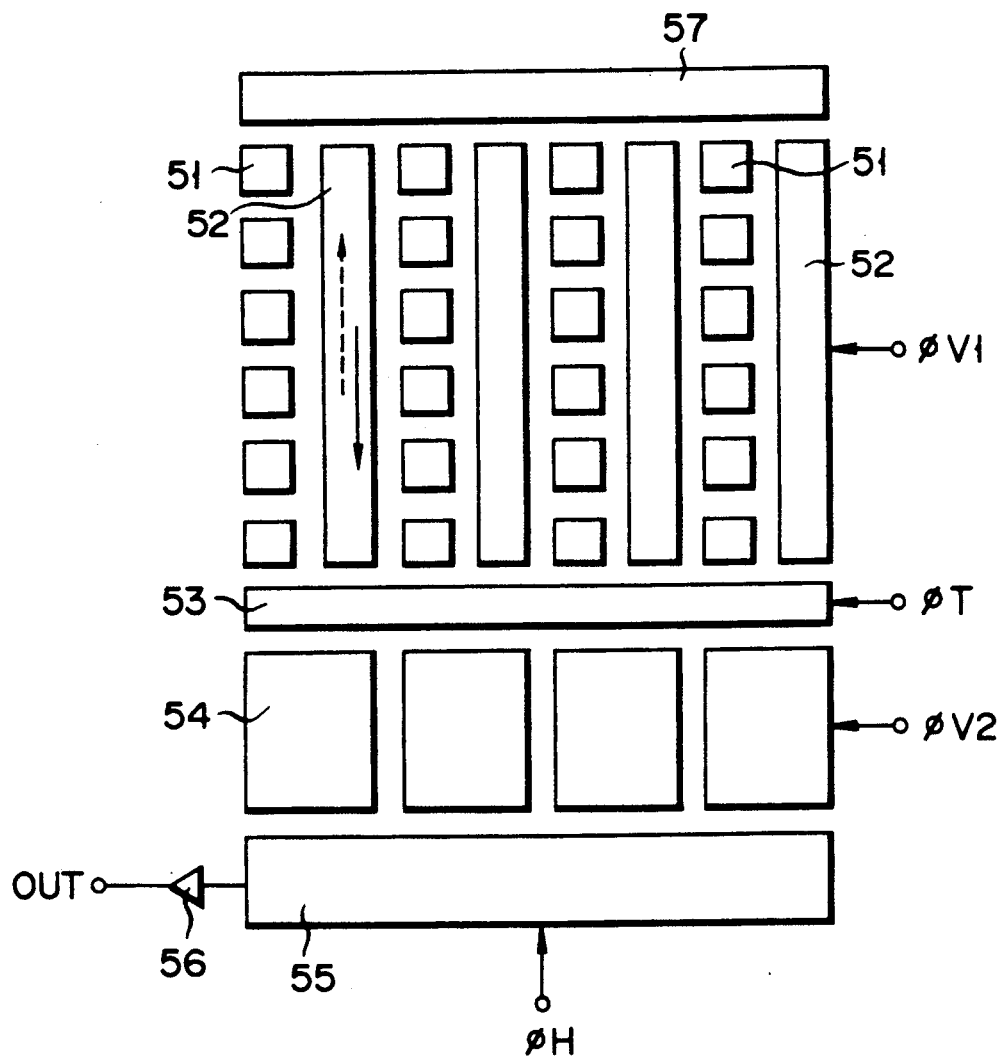
FIG. 5 is a diagram showing the modeled construction of a CCD array used in the embodiment shown in FIG. 1.

FIG. 5 shows the modeled construction of one example of a frame interline transfer type CCD solid state imaging device.

The CCD array has image receiving portions 51 formed of photoelectric conversion elements such as photodiodes arranged in a matrix form. Vertical transferring portions 52 are arranged along and adjacent to the columns of image receiving portions 51. Charges in each of image receiving portions 51 are transferred to a corresponding one of the vertical transferring portions 52 in response to field shift pulse $\phi vl$, and the transferred from one end thereof to charge storage section 54 acting as a frame memory section via transfer gate 53. Signal charges in charge storage section 54 are transferred to output circuit 56 via horizontal transferring section 55 and then output as an electrical signal. Drain portion 57 is arranged adjacent to the other ends of vertical transferring sections 52.

In a case where only one CCD array of this type is used to derive out a color image signal, an optical color filter for separating light components of red (R), green (G) and blue (B) is disposed on each image receiving portion 51. Various types and arrangements of the optical color filters are known in the art, and any type and arrangement may be used in the electronic still camera of this invention.

Referring to FIGS. 6A and 6B, electronic still camera 10 of this invention is explained in more detail.

The user can select a desired mode by operating mode switch 12 prior to the operation of release 11 by taking the quality of image stored in the memory card and the number of frames stored in the memory card into consideration. Modes may be individually selected for each frame of still images to effect photographing. The reason why the mode can be changed for each frame will be described later. A selected mode signal is supplied from central processing unit (CPU) $24_1$ to switch $31_5$. When the memory card 15 is set to the camera body, CPU $24_1$ reads information (a file number, a number of using blocks, etc. which will be described later) of the memory card 15, and in case of a new card, it is initially set.

When release 11 is depressed halfway, information of external color temperature and the information of light exposure are supplied from white balance sensor 17 and exposure sensor 19 to CPU $24_1$ via interface (I/F) $24_2$. CPU $24_1$ controls diaphragm driving circuit $24_5$ in response to the information of light exposure so as to drive diaphragm 22. Further, CPU $24_1$ controls CCD driving circuit $25_2$ via I/F $24_3$ and signal generator $25_1$ according to the information of white balance and light exposure so as to drive CCD array 26. Flash driving circuit $24_4$ is controlled by a signal supplied from CPU $24_1$ via I/F $24_3$, and it is determined whether or not flash 16 such as an electronic flash should be driven by flash driving circuit $24_4$ at the photographing time. Amplifier circuit $27_1$ and color separation-$\gamma$ correction-white balance circuit $27_1$ are each controlled by a signal supplied from CPU $24_1$ via I/F $24_3$ and a signal supplied CPU $24_1$ via I/F $24_3$ and signal generator $25_1$.

When release 11 is further depressed to a fully depressed position, signal generator $25_1$ supplies respective driving signals to CCD array 26, amplifier $27_1$, color separation-$\gamma$ correction-white balance circuit $27_2$, A/D conversion circuit 28, signal processing circuit $31_1$, filter $31_2$, sub-sampling circuit $31_3$, data compression circuit $31_4$, switch $31_5$, and memory interface (memory I/F) $31_7$.

An image information signal is output from CCD array 26 in response to the above described operation of release 11. The image information signal is amplified to a preset level by amplifier $27_1$, and R, G and B signals are supplied in parallel to A/D conversion circuit 28 via color separation-$\gamma$ correction-white balance circuit $27_2$ including a color separation circuit, white balance circuit and $\gamma$ correction circuit. R, G and B digital signals output in parallel from A/D conversion circuit 28 are converted into luminance signal Y1 and color difference signals CR1 and CB1 by signal processing circuit $31_1$, and color difference signals CR1 and CB1 are supplied to low-pass filter $31_2$ after the sampling number thereof is reduced to one half. In this case, luminance signal Y1 is supplied to low-pass filter $31_2$ with the sampling number kept unchanged. Thus, luminance signal Y1 and color difference signals CR1 and CB1 are obtained as linearly quantized data with each sampled value represented by 8 bits. FIG. 7 shows the relation between the sampling points of luminance signal Y1 and those of color difference signals CR1 and CB1. Low-pass filter $31_2$ is a pre-low-pass filter for sub-sampling. Luminance signal Y1 and color difference signals CR1 and CB1 are supplied to sub-sampling circuit $31_3$ via low-pass filter $31_2$. In sub-sampling circuit $31_3$, luminance signal is subjected to a line-offset sampling process and converted into luminance signal Y2 whose sampling number is reduced to one half, and color difference signals CR1 and CB1 are sampled in every other line and converted into color difference signals CR2 and CB2 whose sampling number is reduced to one half. FIG. 8 shows the relation between the sampling data points of the signals. Luminance signal Y2 and color difference signals CR2 and CB2 are supplied to data compression circuit $31_4$. As described before, luminance signal Y2 and color difference signals CR2 and CB2 are linearly quantized using 8 bits for each sampled value, but the data bit number for each sampling value is reduced in data compression circuit $31_4$. In this embodiment, differential pulse code modulation (DPCM) is used, for example, as the data compression system to effect the data compression. The data compression by DPCM is well known in the art, each sampling data is quantized by nonlinearly compressing a difference between the sampling data and receding sampling data. For example, in the case of luminance signal Y12 of FIG. 8, a difference between luminance signals Y11 and Y12 is nonlinearly quantized, and each sampling value is represented by 4 or 2 bits. Likewise, color difference signals CR1 and CB1 are compressed and each sampling value is represented by 4 or 2 bits. The luminance signal thus compressed is denoted by Y3, and the color difference signals thus compressed are denoted by CR3 and CB3.

Switch $31_5$ is used to select the luminance signal and color difference signals according to the set mode. In a case where mode (A) is set, for example, signals Y1, CR1 and CB1 supplied from signal processing circuit $31_1$ are selected by switch $31_5$ and stored into memory card 15 via buffer memory $31_6$. Likewise, in mode (B), signals Y2, CR2 and CB2 supplied from sampling circuit $31_3$ are selected by switch $31_5$, in mode (C), signals Y3, CR3 and CB3 compressed by data compression circuit $31_4$ to represent each sampling value by 4 bits are selected by switch $31_5$, and in mode (D), signals Y3, CR3 and CB3 compressed by data compression circuit $31_4$ to represent each sampling value by 2 bits are selected by switch $31_5$. The signals selected by switch $31_5$ are stored in memory card 15 via buffer memory $31_6$.

In addition to image data, information relating to the selected mode is also stored into memory card 15 together with the image data. (For example, in modes (A) and (B), "001" and "010" are stored in the form of binary code indicating the selected mode numbers).

For example, it is also possible to store in memory card 15 imaging data such as data relating to use of the flash, white balance control data, exposure data (or aperture data) and shutter speed data in the form of binary code as well as the selected mode. The imaging data is displayed on display unit 13 by the control of CPU $24_1$, thereby permitting the user or operator to recognize the imaging data by observing display unit 13.

A method of storing data into memory card 15 is explained in detail with reference to FIGS. 9A to 9E. In this example, a memory card of 20 Mbits or 2.56 Mbytes which has 20 RAMs or static RAMs (SRAM) of 1 Mbits mounted thereon as shown in FIG. 4 is used.

Figure 9C:
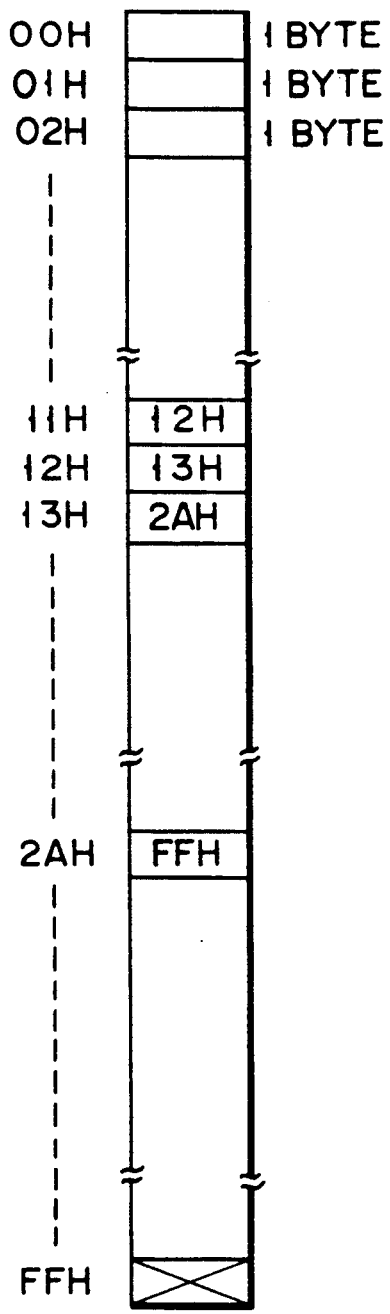
Figure 9D:
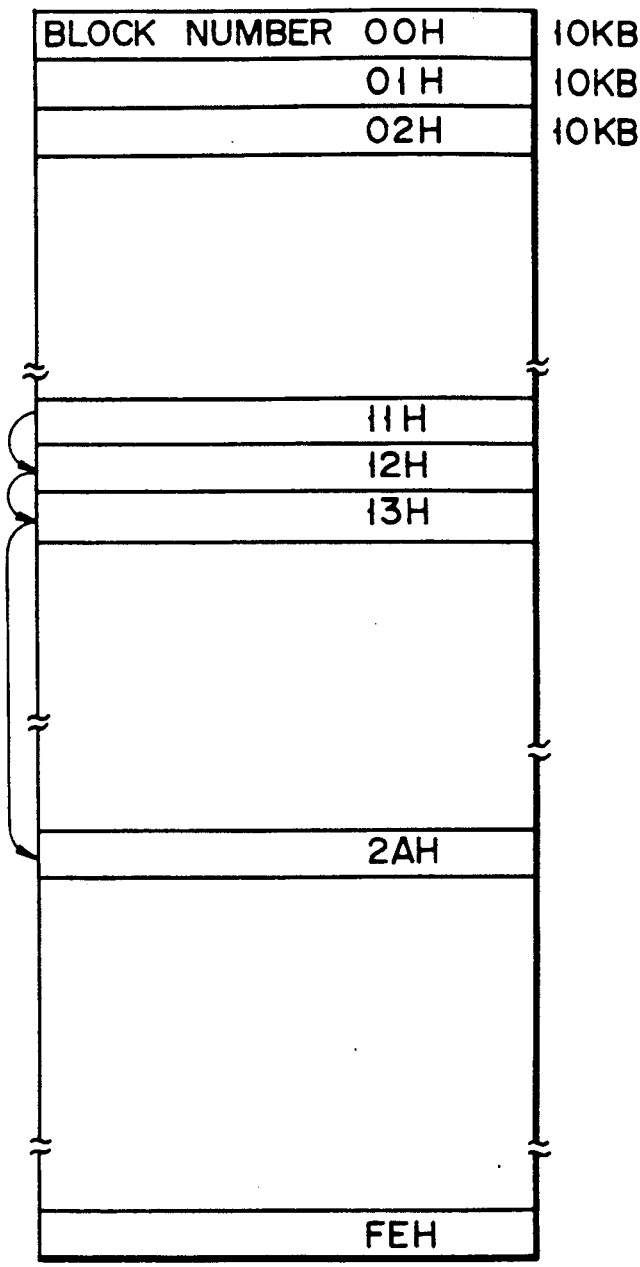

As shown in FIG. 9A, all the memory space is divided into directory area, a file allocation table (FAT) and a data area. As shown in FIG. 9B, there are stored in the directory area various items of 1-byte information which include information indicating a file number or image (frame) number in the case where the file is image data; information indicating data classification or the classification of image data, voice data or other data; information indicating the imaging system, that is, the 525 (lines)/60 (fields) system or 625 (lines)/50 (fields) system in the case of image data; information indicating the imaging mode or image compression method (indicating the case where no data compression is effected); information indicating the voice mode or compression method in the case of voice data; information indicating the year in which the recording or photographing was effected; information indicating the month in which the recording was effected; information indicating the date on which the recording was effected; information indicating the hour at which the recording was effected; and information indicating the minute at which the recording was effected. Further, the entry block number of the file (image data file) and the number of data blocks used for storing the file are stored into the directory area. The directory area has 16 bytes for each file, and 256 files (256 frames in the case of image data) are allotted thereto. As a result, the directory area has a memory capacity of 4 Kbytes. FIGS. 9C and 9D respectively show the FAT area and data area. 256 bytes are allotted to the FAT area, and addresses from OOH to FFH are assigned thereto. The data area is divided into blocks each having 10 Kbyts, and block numbers OOH to FFH are assigned to the respective blocks.

Figure 9E:
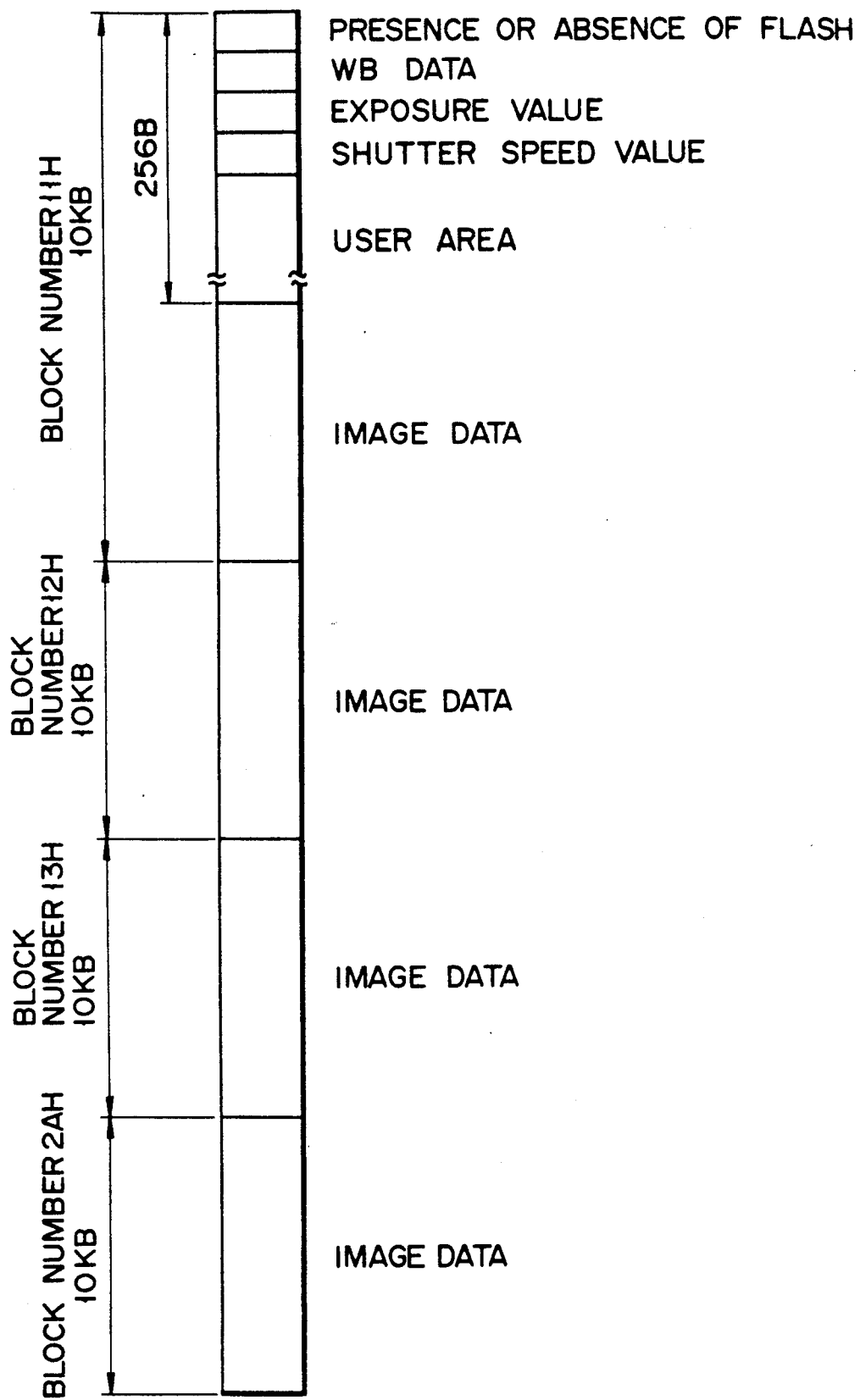

In order to clarify the explanation, assume that approx. 40 Kbytes are necessary to store one frame data, for example. Then, 11H and 40H, for example, are written in the directory area as the entry block number and the number of available blocks, respectively. 12H, 13H, 2AH and FFH are written into addresses 11H, 12H, 13H and 2AH of the FAT area, respectively. Image data of one frame is written into a 40-Kbyte area obtained by linking block numbers 11H, 12H, 13H and 2AH of the data area. FFH written into the address of 2AH of the FAT area indicates the last block. FIG. 9E shows the 40-Kbyte memory area obtained by linking the blocks. In the first block or 256-byte block of block number 11H, data indicating presence or absence of the flash (or information as to whether the flash has been used or not), white balance data, and photographing condition data including the exposure value (or aperture value) and shutter speed are recorded, and the remaining 252-byte area is used a user area for recording the title, for example. Image data may be successively recorded in an area from 257th bite to block number 2AH. 64 blocks, 32 blocks, 16 blocks and 8 blocks are used respectively in modes (A), (B), (C) and (D).

In this system, when a variable length coding system in which the memory capacity for each frame attained after the coding operation may be varied is used, data can be recorded on the memory card without causing any problem. That is, after the coding operation, data is temporarily stored in buffer memory $31_6$. The capacity of the buffer memory $31_6$ is set at least to a value enough to store the data of one frame. The memory capacity needed for storing the data of each frame is recognized from the condition of use of the buffer memory. Based on the necessary memory capacity, the number of data blocks required for recording one-frame data can be calculated. When the number of available data blocks is not sufficient, the image data is kept stored in buffer memory $31_6$ and the next photographing operation is inhibited until a new memory card is set. In order to cope with the situation where it takes a long time to obtain a new memory card, it is desirable that buffer memory $31_6$ is backed up by the battery so that even if the power source switch of the apparatus is turned off, the stored content of the buffer memory $31_6$ is kept for a long period of time. In the case where the image data stored in the buffer memory $31_6$ is unnecessary, the buffer memory $31_6$ is reset by the reset button 9 shown in FIG. 6A.

Now, the processing for effecting the above recording operation is explained in detail with reference to FIG. 10 showing the flowchart.

A routine of the flowchart of FIG. 10 is started at the same time when the power source switch not shown is turned on to render the power source effective.

First, when memory card 15 is set to the camera body, CPU $24_1$ detects the insertion of memory card 15 through memory I/F $31_7$ (step ST1) and reads directory information (for example, information such as a file number already used, a block number already used, etc.) in the memory card 15 (step ST2). Next, judgement is made as to whether or not a new data can be written into buffer memory $31_6$ (whether or not the buffer memory $31_6$ has already been cleared) (step ST3). If the writing of new data into the buffer memory $31_6$ can be made, mode information (modes (A) to (D)) set at that time are read (step ST4), and the selecting state of the switch $SW31_5$ is set according to the mode information. Accordingly, the switch $SW31_5$ is switched to the selecting state when the mode information is switched by the mode switch.

The photographing operation is started and when an input by the operation of the release 11 is made (step ST6) (the photographing timing is determined by the operating input of the release 11), the photographed image data is written into the buffer memory $31_6$, and the photographing information to be written into the directory area, including information of presence or absence of use of flash, information of white balance, information of exposure value (or aperture value), information of shutter speed, information of year, information of month, information of day, information of time and information of minute, are taken (step ST7). The mode information and the directory information of memory card 15 set are already taken in step ST4 and step ST2. The entry block number of the memory card 15 is set on the basis of these information (step ST8). The data block number used to record the image of one frame to be photographed is obtained according to the mode information (step ST9). The recordable capacity (remaining amount) of the memory card 15 set is checked, and in the case where the number of data blocks necessary for recording the image cannot be secured in the memory card 15 (step ST10), the user is urged to replace the memory card 15 (by the display of display unit 13 or suitable alarm, for example, sounding of a buzzer). If a new memory card 15 is set (step ST14), the step ST1 is effected again. In the case where the number of data blocks necessary for recording the image can be secured in the memory card 15 set (step ST10), address of FAT of the memory card 15 is allotted (step ST11), and the image data (already stored in the buffer memory $31_6$) and the aforementioned photographing information are written into the memory card 15 through the buffer memory $31_6$ (step ST12).

After all the data has been transferred to the memory card 15, the buffer memory $31_6$ is cleared to render the buffer memory $31_6$ storable condition (step ST13). After step ST13, the processing is returned to step ST3.

On the other hand, when a new memory card 15 is inserted, step ST1 is again effected to read the directory information of the new memory card 15 (step ST2). In the case where the number of blocks remaining in the memory card 15 is insufficient for recording the image and a new memory card 15 is inserted, the buffer memory $31_6$ is not cleared (step ST3), and therefore, step ST8 is effected to effect the processing of setting the entry block number of memory card 15, and steps ST9, ST10, ST11 and ST12 are effected and step ST13 is then effected.

On the other hand, in the case where the new memory card is not set in step ST14, the image data stored in the buffer memory $31_6$ is abandoned by a reset signal resulting from the operation of the reset button 9 (step ST15), and step ST13 is effected.

Figure 11:
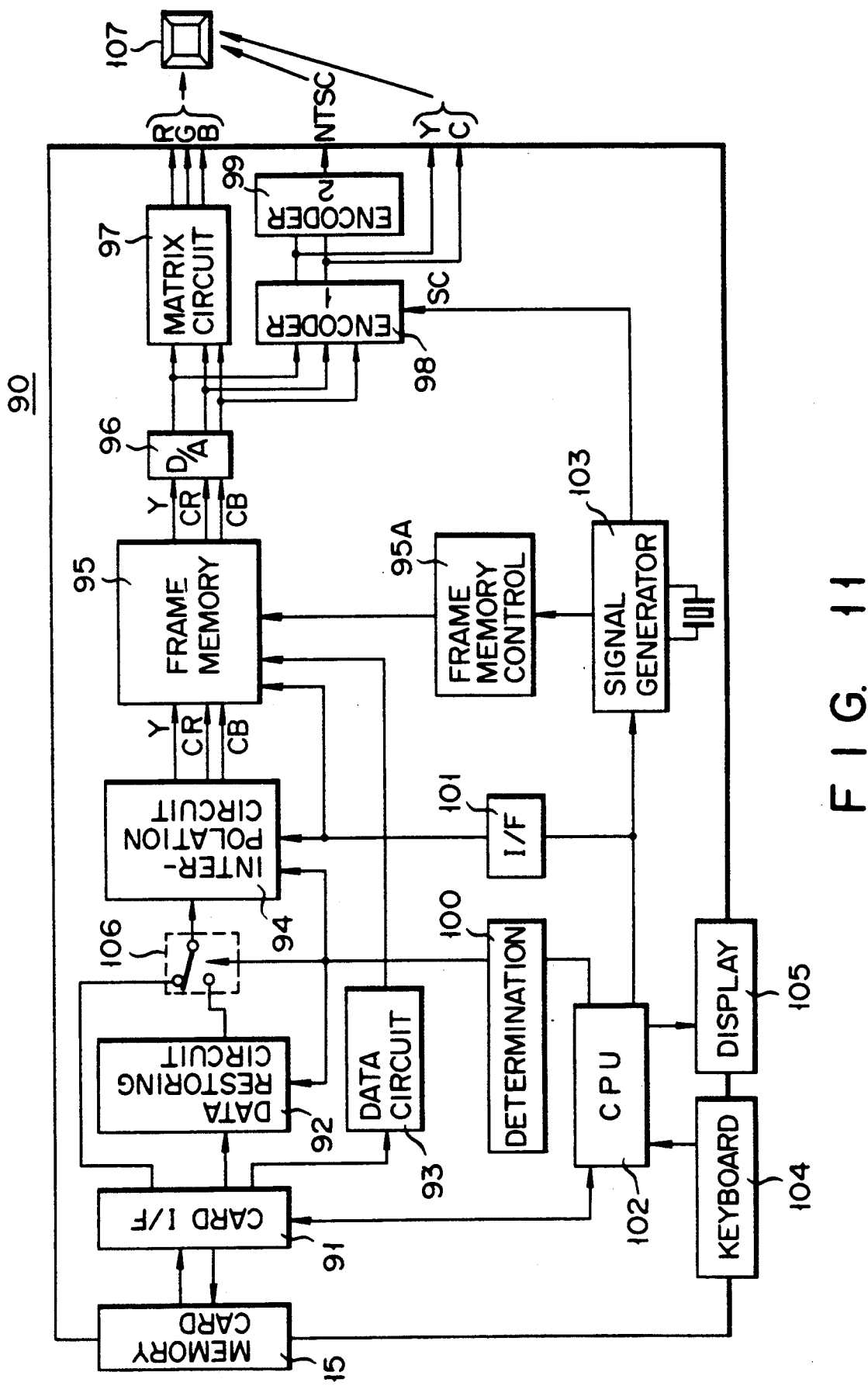
FIG. 11 is a block diagram showing the schematic construction of a reproducing unit for reproducing an image from the memory card recorded by the camera of this invention.

Next, the reproducing unit for reading out the image data from memory card 15 and displays video image on a TV monitor or the like is explained with reference to FIG. 11.

When memory card 15 is inserted into reproducing unit 90 and keyboard 104 is operated to specify a file number (image number), then CPU 102 reads out information from the directory area in the memory card via card interface (card I/F) 91. CPU 102 determines whether the information classification of the specified file number is image data or not, the type of imaging system, and the type of compression mode. At the same time, CPU 102 determines the entry block number. The CPU 102 reads out information of all the block numbers from the FAT area. After block numbers are supplied to card I/F 91, by means of CPU 102, it supplies addresses corresponding to the received block numbers so as to read out image data for each byte. Further, CPU 102 controls the signal processing operation based on information of the imaging system and mode which has been previously read out. For example, when the mode is mode (C), data compressed into 4-bit data is restored into 8-bit linearly quantized data by use of data restoring circuit 92, and if the mode is mode (D), 2-bit data is restored into 8-bit data. In the case of modes (A) and (B), the read-out image data is input to interpolation circuit 94 without being supplied to data restoring circuit 92. Luminance signal Y1 and two color difference signals CR and CB are output from interpolation circuit 94 and one frame data is written into frame memory 95. In the case of mode (C) or (D), the image data is written into frame memory 95 via data restoring circuit 92 and interpolation circuit 94.

The above signal processing is controlled according to the modes as will be described below.

A mode signal output from card I/F 91 is input to determination circuit 100 via CPU 102, and the mode is determined by means of determination circuit 100. The switching position of switch 106 is set according to the result of the determination in determination circuit 100, and at the same time, the operation of data restoring circuit 92 and interpolation circuit 94 is changed and controlled according to the determination result.

Further, data other than the image data output from card I/F 91 is stored into frame memory 95 via data circuit 93 in the same manner as the image data. After one frame data is written into frame memory 95, a read-out clock is supplied from signal generator 103 to memory 95 and then luminance signal Y and color difference signals CR and CB are read out from the memory. Luminance signal Y and color difference signals CR and CB are converted into an analog signal by means of digital-analog (D/A) converter 96. If an input method of TV monitor 107 is an RGB (red, green and blue) input method, analog R, G and B signals are formed in matrix circuit 97 and supplied to TV monitor 97. If the input method of TV monitor 107 is an NTSC composite input method, luminance signal Y and color difference signals CR and CB converted into the analog form are converted into a composite signal by use of first encoder 98 and second encoder 99 and then supplied to TV monitor 107. If the input method of TV monitor 107 is a Y-C separation input method, luminance signal Y and color difference signals CR and CB converted into an analog form are converted into luminance signal Y and color difference signals C by means of first encoder 98 and then supplied to TV monitor 107.

As described above, the photographed image stored in memory card 15 can be displayed. Of course, it is possible to obtain a hard copy if output terminals such as R, G and B output terminals are connected to a video printer.

In the system of this invention, recorded images can be erased for each frame. The operation of erasing the image for each frame is effected as follows:

When key board 104 of the reproducing unit is operated to specify the image number so as to issue an erasing command, CPU 102 searches the directory area of memory card 15 via card I/F 91 to detect the image number (file number) corresponding to the specified image number. When the specified image number is detected, FFH is written into areas of a corresponding directory image number, entry block number and the number of blocks to be used. Further, the memory contents of the address used in the FAT area is erased (OOH is written into all the corresponding addresses).

In the electronic still camera, when one image frame is additionally recorded, the FAT area is searched (by CPU $24_1$) and address in which OOH is written is detected. The lowest one of addresses in which OOH is written is set as an entry block number, and the number of necessary blocks based on the memory capacity required for storing one frame and address for linking the blocks is written into the FAT area. Next, data of information classification and file number is written into one of vacant directories (file number is FFH), and the entry block number and the number of blocks used are written into the last two words. After this, image data and photographing condition data such as the presence or absence of the flash are sequentially stored into the linked blocks. If it is detected as the result of the searching of the FAT area that the number of blocks is not large enough to record the image, a signal indicating that the photographing cannot be effected is generated to display an alarm indicating the write unable condition on display unit 13. The alarm may be displayed by a light emitting diode (LED).

In the above example, each block is formed of 10 K bytes. However, in a case where it is desired to more finely adjust the memory capacity required for recording one frame image data, the size of each block can be reduced or the minimum memory capacity required for recording one frame may be set as one block. It is desired that the size of the block is a value of the greatest common divisor of the capacity for recording one frame in each mode in order that an invalidated portion of memory is zero or minimum in each mode capable being selected. If the size of one block is made to be the value as just mentioned, there arises a merit that the FAT can be reduced.

For example, assume that there are mode (A) of 640 K bytes, mode (B) of 320 K bytes, mode (C) of 160 K bytes, and mode (D) of 80 K bytes, if the size of one data block is 80 K bytes, the FAT for memory card 15 provided with memory of 2.56 M is 32 bytes.

Further, luminance signal Y and two color difference signals CR and CB are used. However, it is possible to use (R-Y) and (B-Y) signals as the color difference signals. These signals Y, (R-Y) and (B-Y) can be easily derived from signals R, G and B as follows:

$Y = 0.30R + 0.59G + 0.11B$ $R-Y = 0.70R - 0.59G - 0.11B$ $B-Y = -0.30R - 0.59R + 0.89B$

Likewise, signals I and Q can be utilized as two color difference signals.

In the above example, data compression is effected by use of DPCM to reduce the memory capacity for one sampling value. However, there are various types of data compression methods in which different methods of forming prediction signals are used, different methods of selecting non-linear quantizes are used, or a transform coding method is used. Any one of the data compression methods can be used only if information indicating the data compression method used is stored in the memory card as the mode information in the form of binary data.

Figure 12B:
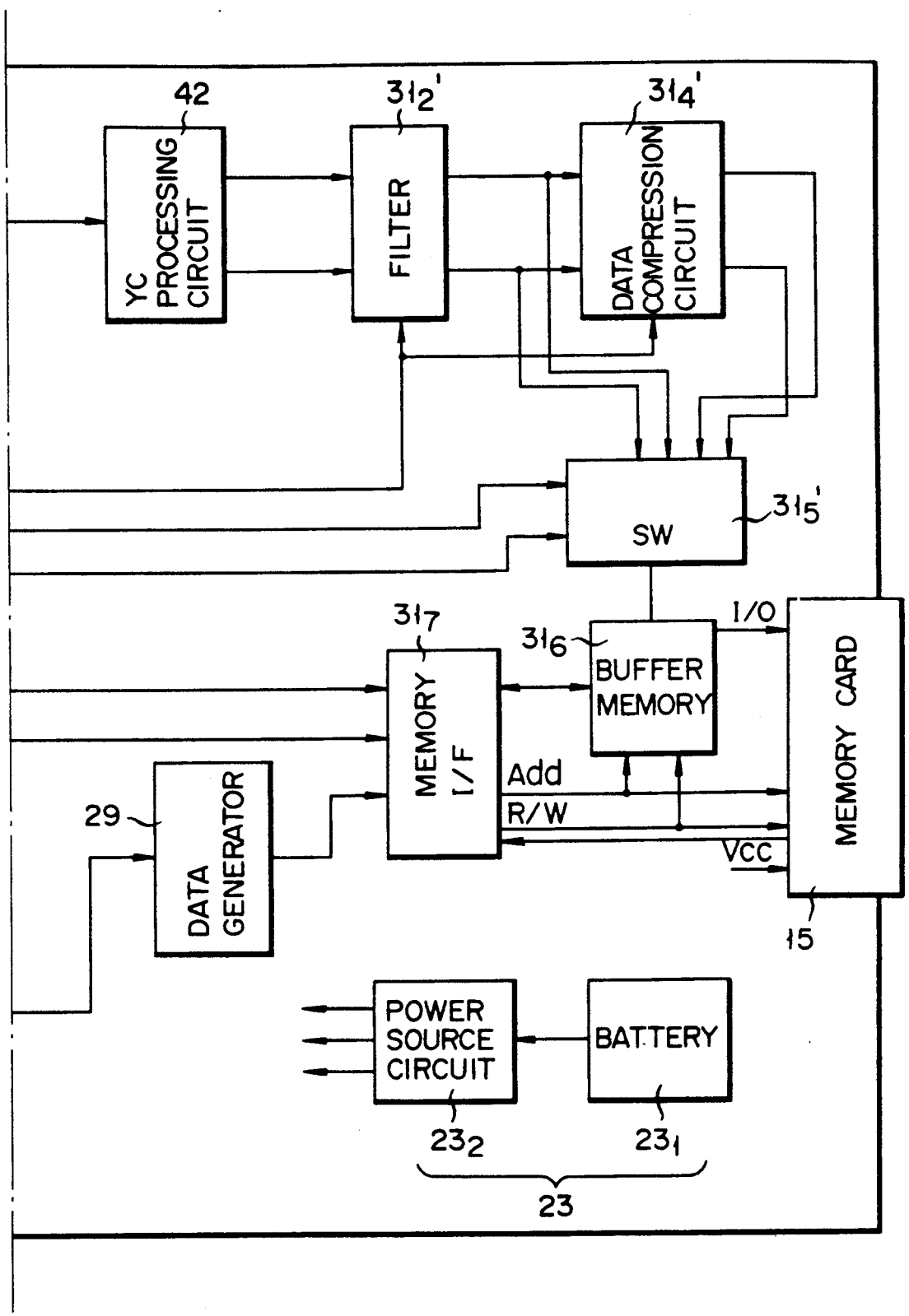
Figure 13:
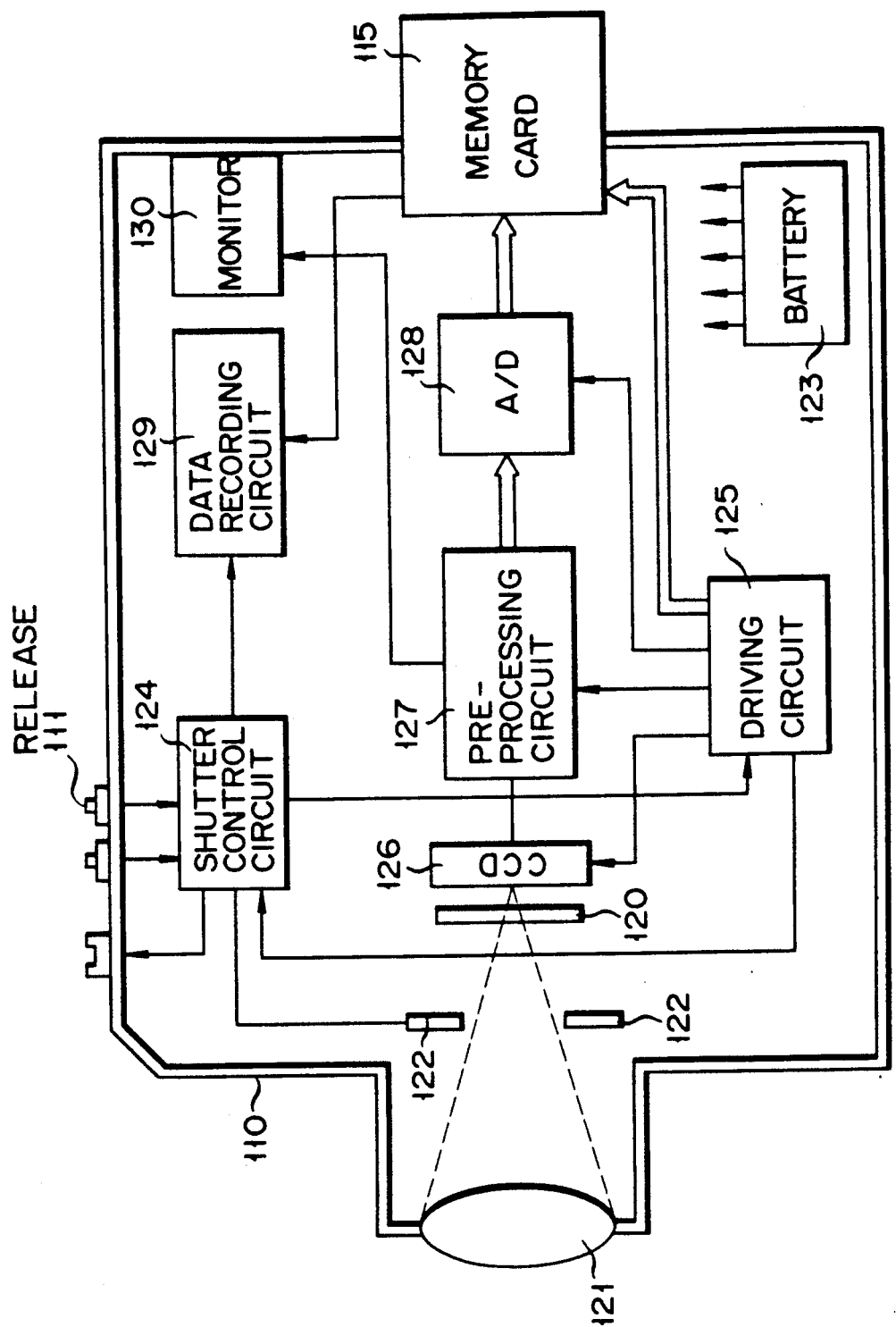
FIG. 13 is a diagram showing the construction of the conventional electronic still camera.

Further, FIGS. 12A and 12B show another construction of an electronic still camera according to the second embodiment of this invention. In this method, a section including A/D conversion circuit 28, signal processing circuit $31_1$, filter $31_2$, sub-sampling circuit $31_3$, data compression circuit $31_4$ and switch $31_5$ shown in FIGS. 6A and 6B is omitted, and mixture circuit 41, A/D conversion circuit 28', YC processing circuit 42, filter $31_2'$, data compression circuit $31_4'$, and switch $31_5'$, are used. In this embodiment, R, G and B signals output from color separation·γ correction·white balance circuit $27_2$ are combined by means of mixer circuit 41, converted into digital form by A/D conversion circuit 28' and then supplied to YC processing circuit 42. A luminance signal and color difference signals are supplied to data compression circuit $31_4'$ via filter $31_2'$. An input to and output from data compression circuit $31_4'$ re selected by switch $31_5'$.

While in the method employed in the first embodiment described by reference to FIG. 10, the image data according to the mode set by the photographing of the still image is once stored in the buffer memory and thereafter whether or not the stored data can be written into the memory card, it is noted that a method may be employed in which whether or not the writing can be made by the mode set prior to the photographing is known to the user. Since the directory information of the memory card 15 is controlled by CPU 24, when determination is made CPU $24_1$ that the writing is impossible by the set mode, the display by the display unit 13 or alarm (buzzer) is provided. In this case, steps ST9, ST10 and ST14 in the flowchart of FIG. 10 are provided before the step corresponding to step ST6. The reset button 9 and the step for operation thereof (corresponding to step ST15) are naturally eliminated. Alternatively, the number of photographs capable of being taken by the set mode in the remaining capacity of the memory card 15 set may be displayed on the display unit 13.

Figure 15:
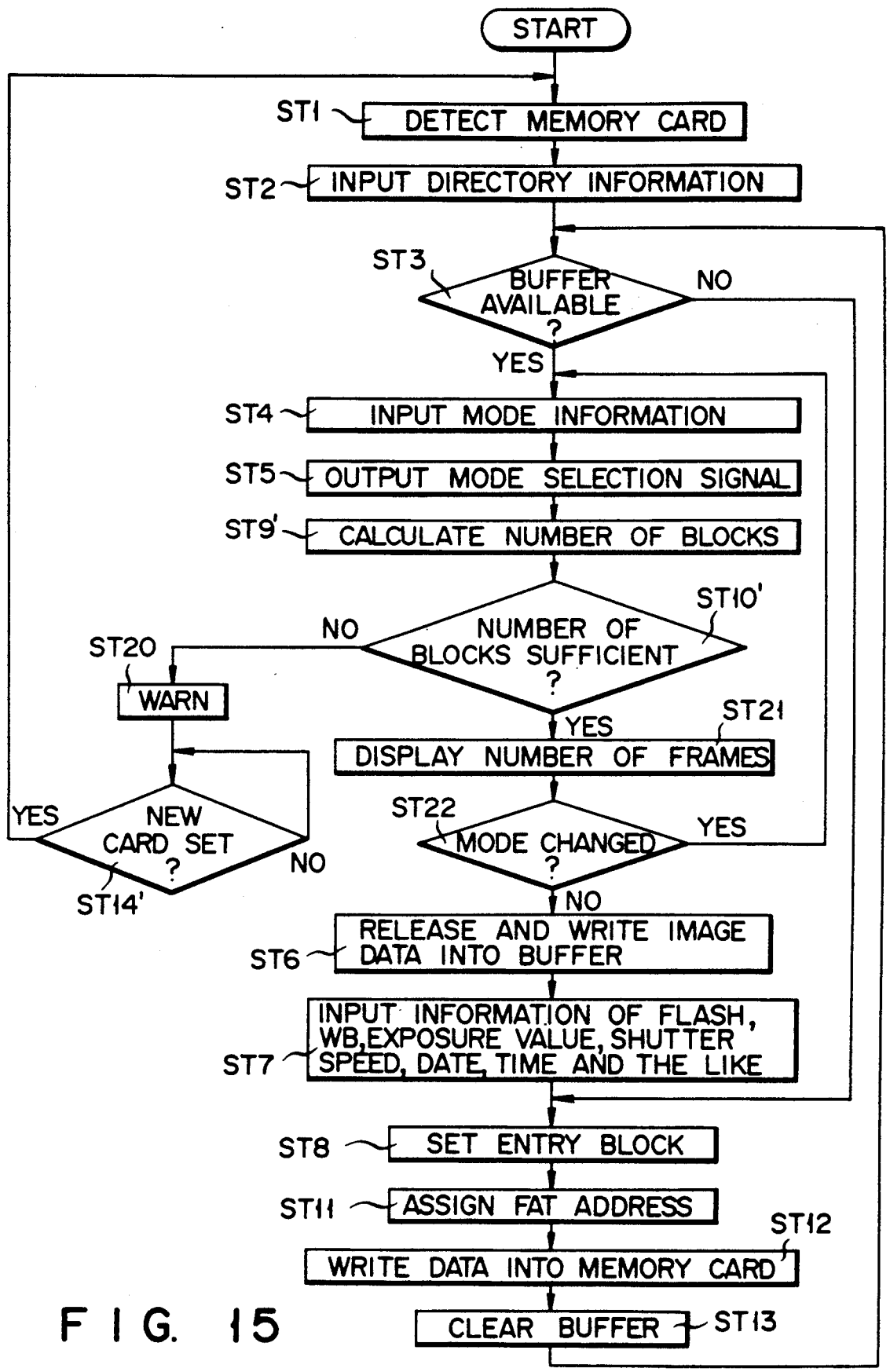
FIG. 15 is a flowchart showing the process in detail at the time of photographing in the embodiments shown in FIGS. 14A and 14B.

FIGS. 14A and 14B show the construction of an electronic still camera according to a third embodiment of this invention having the above features. FIG. 15 shows a flowchart for the process of processing for effecting the recording.

The electronic still camera shown in FIGS. 14A and 14B has exactly the same construction as that shown in FIGS. 6A and 6B except that the reset switch 9 is not provided.

In FIG. 15, steps corresponding to steps ST9, ST109 and ST14 in the flowchart of FIG. 10, that is, step ST9' for calculating the data block number used to record the image data of one frame according to the mode information, step ST10' for checking whether or not the number of data blocks necessary for recording the image in the memory card 15 can be secured and step ST14' for checking the setting of a new card are provided before step ST6' for the operating input of release 11 corresponding to step ST6. In the flowchart of FIG. 15, in the case where the number of data blocks necessary for recording the image of one frame cannot be secured in the memory card 15, step ST20 for urging the user to replace the memory card 15 by the display of the display unit 13 or suitable alarm, for example, a buzzer is clearly shown between step ST10' and step ST14'. In the case where the number of data blocks necessary for recording the image of one frame can be secured in the memory card 15, the number of the remaining frames capable of being recorded in the mode is displayed on the display unit 13 (step ST21), and the presence or absence of change in mode is checked (step ST22), and if the change in mode is present, step ST4 is again effected.

In the flowchart of FIG. 15, in step ST9', CPU $24_1$ calculates the data block number used to record the image data of one frame according to the set mode information. However, ROM (read only memory) storing in advance therein data amount of frames for each recording mode is separately provided and searched to thereby obtain the data block number. This method is particularly effective in case where there are very many recording mode numbers. The data relating to the residual amount of the memory card 15 set may be retained in the register provided within the memory I/F 317 instead of being controlled by CPU $24_1$, and reference is made thereto.

The kinds of the recording modes are not limited to four kinds as described above but a variety of recording modes are considered according to a difference in data compression method, a difference in information subjected to data compression, a difference in the number of photographing picture elements and a difference in other photographing or recording conditions or a combination thereof.

In the electronic still camera according to the third embodiment, when the residual capacity of the memory card 15 is the block number which can record the data for 80K bytes of mode (D) but cannot record the data more than the former, and the release 11 is depressed despite an alarm is issued when the mode of camera is mode (A) (640K), then the photographing mode in the camera may be forcibly set to mode (D) to write it into the memory card 15.

The semiconductor memories used for the memory card 15 include EPROM (erasable programmable ready-only memory) or $E^2$PROM (electrical erasable programmable read-only memory) other than the backed-up SRAM (static random-access memory) or DRAM (dynamic random-access memory). According to the kind of these memories, the data writing method differs and the access time at the time of writing differs among the same kind of memories. The electronic still camera using many kinds of memory cards 15 different in semiconductor memories thus used need to read the kind of the semiconductor memory of the memory card 15 and use a writing method matched to the memory.

As the function often required for the still camera, there is a continuous photographing function for continuously photographing a plurality of frames. The upper limit of the photographing speed has restrictions of film winding mechanism in case of a camera using a silver salt film and of movement of a magnetic head in case of an electronic still camera using a video floppy, these being restrictions due to the operating speed in terms of mechanism. However, in case of the memory card type digital electronic still camera without a drive portion of a recording medium as in the electronic still camera of this invention, the upper limit of the speed is restricted by time required for the writing into the semiconductor memory. Accordingly, in the case where the electronic still camera of this invention has the continuous photographing function, the upper limit of the speed should be controlled.

Figure 16B:
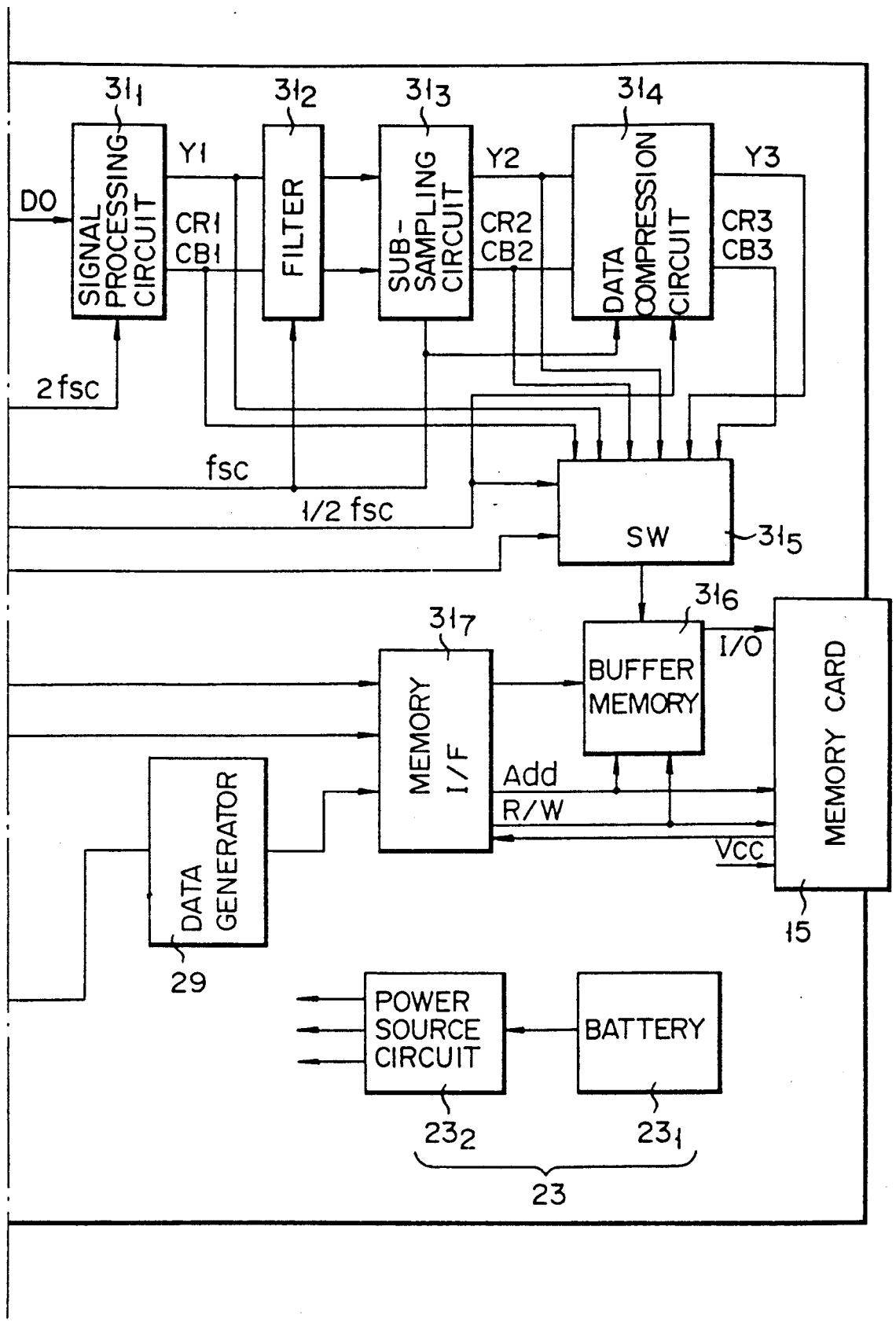

In view of the foregoing, in the case where the electronic still camera has the continuous photographing function, it is desired that the upper limit of the photographing speed is determined according to the kind of the semiconductor memory of the memory card and the writing access time to display an alarm in the case where the set speed exceeds the upper limit of the speed obtained as the result of determination or to inhibit the writing in the case where the set speed exceeds the upper limit of the speed obtained as the result of the determination. FIGS. 16A and 16B show the construction of the electronic still camera according to the fourth embodiment of this invention having such a function as described above.

The construction shown in FIGS. 16A and 16B is provided with a continuous mode switch 50 for setting the associated mode in addition to the construction shown in FIGS. 6A and 6B. The photographing speed is decided by the setting of the continuous mode. In the memory card 15 used for this electronic still camera, types of memory and information of access time are written in advance in the directory area as shown in FIG. 17. For example, in the FIG. 17 example, 1 byte is used as information of type of memory and 1 byte used as information of access time.

CPU $24_1$ displays on the display unit 13 the type of memory read from the directory of the memory card 15 and the upper limit of the photographing speed based on the information of access time. When the user operates the switch 50 to set the continuous mode, CPU $24_1$ determines whether or not proper photographing takes place in accordance with the conditions of the set continuous mode. That is, when the photographing speed decided by the conditions of the set continuous mode exceeds the upper limit of the photographing speed based on the type of the memory and the access time, CPU $24_1$ displays a warning on the display portion 13 to the effect that proper photographing is not effected. As the method of warning, a buzzer may be used in combination. As described above, when the photographing speed by the set mode exceeds the upper limit of the photographing speed, CPU $24_1$ further supplies a command for inhibiting writing to memory card 15 to memory K/F 317 to prevent erroneous writing.

The aforementioned protective measure for the photographing speed is not always completely effected but even if a part thereof is executed, the effect to some extent may be obtained.

What is claimed is:

1. An electronic still camera comprising:
   photographing processing means for obtaining image data by photographing;
   recording mode setting means for establishing a recording mode and for varying an amount of the image data to be obtained by said photographing processing means, in accordance with the recording mode;
   a buffer memory for storing the image data obtained from said photographing processing means in accordance with the recording mode set by said recording mode setting means;
   a recording medium detachably coupled said buffer memory, for apropriately recording the image data stored in said buffer memory;

determination means for determining whether or not the image data stored in said buffer memory can be recorded on said recording medium by comparing the amount of the image data with recordable capacity of the recording medium; and recording control means for recording the image data stored in said buffer memory on said recording medium when said determination means determines that said image data can be recorded.

2. An electronic still camera comprising:

photographing processing means for obtaining image data by photographing;

recording mode setting means for establishing a recording mode and for varying an amount of the image data to be obtained by said photographing processing means, in accordance with an established recording mode;

a buffer memory for storing the image data obtained from said photographing processing means in accordance with the recording mode set by said recording mode setting means;

a recording medium detachably coupled to said buffer memory, for appropriately recording the image data stored in said buffer memory;

determination means for determining whether or not the image data stored in said buffer memory can be recorded on said recording medium by comparing the amount of the image data with recordable capacity of the recording medium;

recording control means for recording the image data stored in said buffer memory on said recording medium when said determination means determines that said image data can be recorded; and means by which, when said determination means determines that the image data cannot be recorded, the stored content of said buffer memory is maintained until the image data stored in said buffer memory is determined to be recordable by said determination means.

3. The camera according to claim 2, wherein said photographing processing means includes compression processing means for compressing the image data at a predetermined compression rate.

4. The camera according to claim 2, wherein said recording mode setting means includes compression rate changing means, in order to enable a compression ratio of the image data amount set by said photographing processing means to be externally determined.

5. The camera according to claim 2, further comprising alarm means for issuing an alarm when the image data is determined to be unrecordable by said determination means.

6. An electronic still camera comprising:

photographing processing means for obtaining image data in a plurality of recording modes different in data amount for one frame;

recording mode selection means provided in correspondence to said photographing processing means to select one of the recording modes;

coupling means for detachably coupling a recording medium;

residual amount detection means for detecting the recordable capacity of the recording medium coupled to said coupling means through said coupling means;

calculation means for obtaining the image data amount for one frame in the selected recording mode in response to the selection of said recording mode selection means and obtaining the number of frames capable of being recorded by said recording mode of the recording medium coupled to said coupling means from the image data amount for one frame and the recordable capacity detected by said residual amount detection means;

display means for displaying the frame number obtained by said calculation means; and recording means for recording the image data obtained by said photographing processing means on the recording medium coupled to said coupling means in accordance with the recording mode selected by said recording mode selection means.

7. The camera according to claim 6, wherein said photographing processing means includes compression processing means for compressing the image data at a predetermined compression rate.

8. The camera according to claim 6, wherein said calculation means includes means for obtaining the frame number capable of being recorded in the recording mode whenever the change in selection is effected by said recording mode selection means.

9. An electronic still camera comprising:

photographing processing means for photographing a subject to obtain an image data of a still image;

coupling means for detachably coupling a memory card with a semiconductor memory mounted thereon;

memory information reading means for reading the type of semiconductor memory of said memory card coupled to said coupling means and information of access time from said memory card through said coupling means;

associated mode setting means provided operative to said photographing processing means to set an associated mode for continuously obtaining the image data of still image of plural frames at a plurality of different associated speeds in said photographing processing means;

upper limit speed determination means for obtaining an upper limit of the associated speed from the type of a semiconductor memory of said memory card read by said memory information reading means and information of written access time; and recording means for recording the image data obtained from said photographing processing means on the memory card coupled to said coupling means.

10. The camera according to claim 9, wherein said photographing processing means includes compression processing means for compressing the image data at a predetermined compression rate.

11. The camera according to claim 9, further comprising display means for displaying the upper limit of the associated speed obtained by said upper limit speed determination means.

12. The camera according to claim 9, further comprising alarm means for issuing an alarm when set to the associated mode in excess of the upper limit of the associated speed obtained by said upper limit speed determination means in response to the setting of said associated mode setting means.

13. The camera according to claim 12, further comprising means for inhibiting writing to said memory card by said recording means when photographing is effected setting to the associated mode in excess of the upper limit of the associated speed obtained by said upper limit speed determination means in response to the setting of said associated mode setting means.

14. An image recording method in an electronic still camera comprising the steps of:
    setting a desired recording mode by selecting an arbitrary data amount for one frame of image data;
    obtaining the image data in accordance with the recording mode set by said recording mode setting step;
    storing the image data obtained by said image data obtaining step in a buffer memory;
    determining whether or not the image data stored in said buffer memory can be recorded on a recording medium set to the camera;
    recording the image data stored in said buffer memory on said recording medium when the image data is determined to be recordable by said determination step; and
    maintaining the image data stored in said buffer memory therein until the image data stored in said buffer memory is determined to be recordable by said determination step.

15. The method according to claim 14, wherein said image data obtaining step includes the step of compressing the image data at a predetermined compression rate.

16. The method according to claim 14, further comprising the alarm step of issuing an alarm when the image data is determined to be unrecordable by said determination step.

17. An image recording method in an electronic still camera comprising the steps of:
    selecting a desired recording mode from a plurality of recording modes which are each different in specifying a data amount for comprising one frame of image data;
    obtaining the image data according to the recording mode selected by said recording mode selection step;
    detecting an available recordable capacity of a recording medium set to the camera;
    calculating the image data amount for one frame in the recording mode selected by said recording mode selection step;
    calculating a number of frames capable of being recorded on the recording medium in the recording mode selected from an image data amount for one frame and the recordable capacity detected by said detection step;
    displaying the frame number obtained by said calculation step; and
    recording, on said recording medium, the image data obtained by said image data obtaining step in accordance with the recording mode selected by said recording mode selection step.

18. The method according to claim 17, wherein said image data obtaining step includes the step of compressing and processing the image data at a predetermined compression rate.

* * * * *